United States Patent [19]
Nosaka et al.

[11] Patent Number: 5,481,659
[45] Date of Patent: Jan. 2, 1996

[54] METHOD FOR GENERATING FREE-FORM SURFACE DATA

[75] Inventors: Shiro Nosaka, Kanagawa; Tetsuzo Kuragano, Tokyo, both of Japan

[73] Assignee: Sony Corporation, Tokyo, Japan

[21] Appl. No.: 761,957

[22] PCT Filed: Jan. 18, 1991

[86] PCT No.: PCT/JP91/00045

§ 371 Date: Oct. 8, 1991

§ 102(e) Date: Oct. 8, 1991

[87] PCT Pub. No.: WO91/10965

PCT Pub. Date: Jul. 25, 1991

[30] Foreign Application Priority Data

Jan. 21, 1990 [JP] Japan .................................. 2-010870
Feb. 26, 1990 [JP] Japan .................................. 2-044843

[51] Int. Cl.⁶ .................................................. G06T 17/20
[52] U.S. Cl. .......................................................... 395/123
[58] Field of Search .................................. 395/123, 129, 395/141, 142, 120, 124, 125

[56] References Cited

U.S. PATENT DOCUMENTS

| | | | |
|---|---|---|---|
| 4,766,556 | 8/1988 | Arakawa | 395/124 |
| 4,789,931 | 12/1988 | Kuragano et al. | 364/474 |
| 4,819,192 | 4/1989 | Kuragano et al. | 364/522 |
| 4,829,456 | 5/1989 | Joonishi et al. | 364/522 |
| 4,866,631 | 12/1989 | Kuragano et al. | 364/474.29 |
| 4,888,713 | 12/1989 | Falk | 395/125 |
| 5,175,806 | 12/1992 | Muskovitz | 395/125 |
| 5,179,644 | 1/1993 | Chiyokura et al. | 395/141 |

FOREIGN PATENT DOCUMENTS

173569 7/1987 Japan.
62-73569 7/1987 Japan.

OTHER PUBLICATIONS

Patent Abstracts of Japan, vol. 012, No. 429 (P-785), 14 Nov. 1988 & JP-A-63 159 981 (Sony Corp.), 2 Jul. 1988.
Patent Abstracts of Japan, vol. 012, No. 429 (P-785), 14 Nov. 1988 & JP-A-63 159 982 (Sony Corp.), 2 Jul. 1988.
Proceedings IECON, '86 Sep. 1986, Milwaukee, USA, pp. 61–66; N. Nakajima et al.: "Direct Generation of Solid Model from Wire–Frame Model in CAD System".

*Primary Examiner*—Heather R. Herndon
*Assistant Examiner*—Anton W. Fetting
*Attorney, Agent, or Firm*—Limbach & Limbach

[57] ABSTRACT

A free-form surface data generating method for creating a free-form surface by forming trilateral patches expressed by predetermined vector functions over frame spaces. When specifying a transformation of a common boundary, the common boundary is arbitrarily transformed and, simultaneously, the first and second trilateral patches are connected while keeping a relation in surface geometry. When specifying non-transformation of the common boundary, a curvilinear configuration of the common boundary is maintained, and the first and second patches are connected by arbitrarily transforming the surface geometries of the first and second trilateral patches so that the surface geometries of the first and second trilateral patches are selectable by specifying whether the common boundary is transformed or not. The first and second trilateral patches can thus be connected invariably, surely and smoothly by satisfying only conditions under which a first tangent vector along the common boundary and second and third tangent vectors invariably exist on a same plane at an arbitrary point on the common boundary, where the second and third tangent vectors are directed to the first and second trilateral patches across the common boundary.

3 Claims, 13 Drawing Sheets

METHOD FOR GENERATING FREE-FORM SURFACE DATA

TECHNICAL FIELD

The present invention is directed generally to a method for generating free-form surface data, and more particularly, to a method suited to generate the free-form surface data employed for CAD (Computer Aided Design) or CAM (Computer Aided Manufacturing).

BACKGROUND ARTS

In the case of designing a geometry (geometric modeling) of an object assuming free-form surfaces by, e.g., a CAD-based method, a designer typically has hitherto created a surface expressed by a so-called wire frame. The creation thereof involves the steps of specifying a plurality of points (referred to as nodes) in a three-dimensional space through which the surface passes and causing a computer to compute a boundary curvilinear network which connects the plurality of specified nodes by use of predetermined functions.

It is thus possible to form a multiplicity of frame spaces encircled by the boundary curves (this type of process is hereinafter referred to as frame processing).

The boundary curvilinear network itself, which is formed by this frame processing, represents a rough geometry of the object that the designer intends to design. If a surface expressible by a predetermined vector function can be obtained by an interpolative computation in combination with the boundary curves encircling the respective frame spaces, it is feasible to create a free-form surface (which can not be prescribed by quadric functions) designed by the designer on the whole.

The surface stretched over the individual frame space constitutes a fundamental element which in turn forms the whole surface. This is known as a patch.

In this type of conventional CAD system, a cubic tensor product based on, e.g., easy-to-calculate Bezier formula and B-spline formula is employed as a vector function representing the boundary curvilinear network. The cubic tensor product is considered to be optimal to a mathematical expression of the free-form surface exhibiting no special characteristic in terms of geometry.

More specifically, in the free-form surface with no special geometric characteristic, when projecting points given in the space on an X-Y plane, the points projected thereon are in the great majority of cases arranged in regular matrices. It is a known fact that when the number of these projected points is expressed by m x n, the frame space concerned can easily be stretched by use of a quadrilateral patch expressed by the cubic Bezier formula.

This mathematical expression, however, involves a difficulty in the way of connecting the patches to each other, if applied to a surface exhibiting a geometric characteristic (for instance, a surface assuming a largely skewed geometry). It is required that a high-level mathematical computation be executed, and hence there arises a problem to make computer-based arithmetic operations complicated and huge.

Especially when framing the surface assuming an extremely skewed geometry, most of arrays of the specified points do not have any regularity. Therefore, the method of stretching the quadrilateral patch in the frame space is actually attended with a difficulty to shape a smooth free-form surface.

Proposed under such circumstances was a free-form surface preparing method (Japanese Patent application No. 15396/1986) arranged such that the frame space is shaped by using not the conventional quadrilateral patch but a so-called trilateral patch in which three ways are closed by, e.g., cubic Bezier curves.

Based on this free-form surface generating method, a boundary curve representing a boundary of the frame space undergoing frame processing and patch vectors T stretched over the frame spaces are namely given by the following formulae:

$$T = (w + uE + vF)^3 P_{(00)} \quad (1)$$

$$P_{(11)} = \frac{vwP_x^{u=0} + uwP_x^{v=0} + uvP_x^{w=0}}{vw + uw + uv}$$

(Where, vector $P_x$=vector $P_{(11)}$)

As shown above, there is adopted an expression which uses the vector function vector T based on the cubic Bezier formula.

Note that w in the formula (1) is expressed by the following formula:

$$w = 1 - u - v \quad (2)$$

Therefore, the trilateral patch vector T in the formula (1) is expressible by use of a vector function vector $T_{(u,v)}$ as shown in the following formula:

$$T_{(u,v)} = (1-u-v+uE+vF)^3 P_{(00)} \quad (3)$$

As a matter of fact, a vector $P_{(00)}$ in the formulae (1) and (3) is a positional vector representing one end of a boundary curve (this is referred to as a common boundary COM) of which, as illustrated in FIG. 4, the surface stretched over the adjacent two frame spaces, i.e., a first trilateral patch vector $T_{(u,v)1}$ and a second trilateral patch vector $T_{(u,v)2}$ are mutually possessed. This positional vector is formed of nodes specified on the occation of effecting frame processing together with a positional vector $P_{(03)}$ at the other end, a positional vector $P_{P(30)1}$ of the first patch vector $T_{(u,v)1}$, and a positional vector $P_{(30)2}$ of the second patch vector $T_{(u,v)2}$.

Thus, the first and second patch vectors $T_{(u,v)1}$ and $T_{(u,v)2}$ are encircled by three boundary curves consisting of nodal vectors $P_{(00)}-P_{(30)1} -P_{(03)} -P_{(00)}$ and $P_{(00)} -P_{(30)2} -P_{(03)} -P_{(00)}$. The curve between the nodal vectors $P_{(00)}$ and $P_{(03)}$ among those boundary curves constitutes the common boundary COM. This curve is prescribed as a cubic Bezier curve by two control point vectors $P_{(01)}$ and $P_{(02)}$ set respectively.

In contrast, a boundary curve between the nodal vectors $P_{(00)}$ and $P_{(30)1}$ of the first patch vector $T_{(u,v)1}$ and a boundary curve between the nodal vectors $P_{(30)1}$ and $P_{(03)}$ are prescribed as cubic Bezier curves by sets of two control point vectors $P_{(10)1}$, $P_{(20)1}$ and $P_{(21)1}$, $P_{(12)1}$ which are set respectively.

Besides, a boundary curve between the nodal vectors $P_{(00)}$, $P_{(30)2}$ of the second patch vector $T_{(u,v)2}$ and a boundary curve between the nodal vectors $P_{(30)2}$ and $P_{(03)}$ are similarly prescribed as cubic Bezier curves by sets of two control point vectors $P_{(10)2}$, $P_{(20)2}$ and $P_{(21)2}$, $P_{(12)2}$ which are set respectively.

In the formulae (1) and (3), the symbols E and F designate shift operators in directions u and v. The shift operators have relations defined by the following formulae with respect to a control point vector $P_{(i,j)}$ expressed by the positional vectors on the first and second patch vectors $T_{(u,v)1}$ and $T_{(u,v)2}$:

$$E \cdot P_{(i,j)} = P_{(i+1,j)} \quad (4)$$

$$F \cdot P_{(i,j)} = P_{(i,j+1)} \quad (5)$$

(i, jj=0, 1, 2)

Note that u and v are herein prescribed within a range defined by the following formulae:

$$0 \leq u \quad (6)$$

$$0 \leq v \quad (7)$$

$$u + v \leq 1 \quad (8)$$

Furthermore, in the formulae (1) and (3), the symbols u and v are parameters in the directions u and v. These parameters are, as illustrated in FIG. 7, capable of expressing coordinates on the free-form surface with respect to the patch vectors $T_{(u,v)1}$ and $T_{(u,v)2}$ by using coordinates (u,v), wherein a u-axis is taken in the horizontal direction from the nodal vector $P_{(00)}$, and a v-axis is taken in the vertical direction.

In this definition, a tangent vector taken in the u-direction (i.e., the direction across the common boundary COM) of the first patch vector $T_{(u,v)1}$ at the respective points on the common boundary COM is given in the following formula by effecting a first-order partial differentiation of the formula (3) with respect to the parameter u:

$$\left. \frac{\partial T_{(u,v)1}}{\partial u} \right|_{u=0} = 3(1 - v + vF)^2 a_0 \quad (9)$$

where the vector $a_0$ represents a control edge vector directed from the nodal vector $P_{(00)}$ to the control point vector $P_{(10)1}$. A control edge vector $a_j$ (j= 0, 1, 2) can be expressed by the following formula with respect to the first patch vector $T_{(u,v)1}$ in combination with the shift operator E:

$$a_j = P_{(1,j)1} - P_{0,j} \quad (j=0, 1, 2) \quad (10)$$

Note that the vector $a_1$ represents a control edge vector directed from the control point vector $P_{(01)}$ of the common boundary COM to any one of connection internal control point vectors $P_{(11)1}^{u=0}$, $P_{(11)1}^{v=0}$ and , P and $P_{(11)1}^{w=0}$ of the first patch vector $T_{(u,v)1}$. The vector $a_2$ similarly represents a control edge vector directed from the control point vector $P_{(02)}$ to the control point vector $P_{(12)1}$. Hence, the formula (9) can be transformed into the following formula by using the control edge vectors $a_0$, $a_1$ and $a_2$:

$$3(1-v+vF)^2 a_0 = 3\{(1-v)^2 a_0 + 2(1-v)v a_1 + v^2 a_2\} \quad (11)$$

Similarly, a u-direction tangent vector of the second patch vector $T_{(u,v)2}$ on the common boundary COM can be expressed by the following formula by effecting the first-order partial differentiation of the formula (3) with respect to the parameter u:

$$\left. \frac{\partial T_{(u,v)2}}{\partial u} \right|_{u=0} = 3(1 - v + vF)^2 c_0 \quad (12)$$

where the vector $c_0$ represents a control edge vector directed from the nodal vector $P_{(00)}$ to the control point vector $P_{(10)2}$ of the second patch vector $T_{(u,v)2}$. A control edge vector $c_j$ (j=0, 1, 2) is expressible by the following formula with respect to the second patch vector $T_{(u,v)2}$ in combination with the shift operator E.

$$c_j = P_{(1,j)2} - P_{(0,j)} \quad (j=0, 1, 2) \quad (13)$$

Note that the vector $c_1$ designates a control edge vector directed from the control point vector $P_{(01)}$ of the common boundary COM to any one of connection internal control point vectors $P_{(11)2}^{u=0}$, $P_{(11)2}^{v=0}$ and $P_{(11)2}^{w=0}$ of the second patch vector $T_{(u,v)2}$. The vector $c_2$ likewise represents a control edge vector directed from the control point vector $P_{(02)}$ to the control point vector $P_{(12)2}$. Therefore, the formula (12) can be transformed into the following formula by employing the control edge vectors $c_0$, $c_1$ and $c_2$:

$$3(1-v+vF)^2 c_0 = 3\{(1-v)^2 c_0 + 2(1-v)v c_1 + v^2 c_2\} \quad (14)$$

A v-directional tangent vector on the side of the first patch vector $T_{(u,v)1}$ at the respective points on the common boundary COM can be expressed by the following formula by performing the first-order partial differentiation of the formula (3) with respect to the parameter v:

$$\left. \frac{\partial T_{(u,v)1}}{\partial v} \right|_{u=0} = 3(1 - v + vF)^2 b_1 \quad (15)$$

where the vector b1 indicates a control edge vector directed from the nodal vector $P_{(00)}$ to the control point vector $P_{(01)}$. A control vector $b_j$ (j=1, 2, 3) is expressible by the following formula with respect to the common boundary COM in combination with the shift operator F.

$$b_j = P_{(0,j)2} - P_{(0,j-1)} \quad (j=1, 2, 3) \quad (16)$$

Note that the vector $b_2$ denotes a control edge vector directed from the control point vector $P_{(01)}$ to the control point vector $P_{(02)}$. The vector $b_3$ likewise represents a control edge vector directed from the control point vector $P_{(02)}$ to the nodal vector $P_{(03)}$. Hence, the formula (15) can be transformed into the following formula by use of the control edge vectors $b_1$, $b_2$ and $b_3$.

$$3(1-v+vF)^2 b_1 = 3\{(1-v)^2 b_1 + 2(1-v)v b_2 + v^2 b_3\} \quad (17)$$

When stretching the first and second trilateral patch vectors $T_{(u,v)1}$ and $T_{(u,v)2}$ over the two adjacent frame spaces formed by frame processing, the surface on the common boundary COM is in general unsmooth.

In this free-form surface generating method, the two patch vectors $T_{(u,v)1}$ and $T_{(u,v)2}$ having the common boundary COM are smoothly connected to each other on the common boundary COM. For this purpose, any one of connection internal control point vectors $P_{(11)1}^{u=0}$, $P_{(11)1}^{v=0}$ and $P_{(11)1}^{w=0}$ and any one of $P_{(11)2}^{u=0}$, $P_{(11)2}^{v=0}$ and $P_{(11)2}^{w=0}$ are reset based on any one of u=0, v=0 and w=0 in association with the common boundary COM of the patch vectors T and $T_{(u,v)1}$ and $T_{(u,v)2}$. Reperformed is an interpolative computation about the free-form surface stretched to the patch vectors $T_{(u,v)1}$ and $T_{(u,v)2}$ by using these connection internal control point vectors $P_{(11)1}$ and $P_{(11)2}$.

With this arrangement, it is possible to smoothly connect all the patches over the whole surface framed by the boundary curvilinear network. A multiplicity of objects are thus expressible without making external geometries unnatural.

Note that the smooth connection on the common boundary COM is attainable by obtaining such control edge vectors $a_1$, $c_1$ as to satisfy conditions for tangent plane continuity.

Namely, an establishment of conditions for the tangent plane continuity at all the points on the common boundary COM requires that the u-directional tangent vector (expressed by the formulae (9) and (10)) of the first patch vector $T_{(u,v)1}$, the u-directional tangent vector (expressed by the formulae (12) and (13)) of the second patch vector $T_{(u,v)2}$ and the v-directional tangent vector (expressed by the formulae (15) and (16)) of the first patch vector $T_{(u,v)1}$ exist on the same plane. To accomplish this requirement, the parameters may be reset to meet the condition of the following formula:

$$\frac{\partial T_{(u,v)2}}{\partial u}\bigg|_{u=0} = \alpha(v)\frac{\partial T_{(u,v)1}}{\partial u}\bigg|_{u=0} + \beta(v)\frac{\partial T_{(u,v)1}}{\partial u}\bigg|_{u=0} \quad (18)$$

Incidentally, $\alpha(v)$ and $\beta(v)$ in the formula (18) are the scalar functions with respect to the parameter v. These scalar functions are selected to satisfy relations of the following formulae:

$$\alpha(v)=\alpha_0(1-v)+\alpha_1 v \quad (19)$$

$$\beta(v)=\beta_0(1-v)+\beta_1 v \quad (20)$$

The formula (18) is herein expressible as a determinant with the aid of the formulae (11), (14) and (17):

$$[1\ 1][c_0 2c_1 c_2]=[\alpha_0 \alpha_1]\ [a_0 2a_1 a_2]+[\beta_0 \beta_1]\ [b_1 2b_2 b_3] \quad (21)$$

As a result, the following simultaneous equations are obtained:

$$c_0=\alpha_0 a_0+\beta_0 b_1 \quad (22)$$

$$2c_1+c_0=2\alpha_0 a_1+\alpha_1 a_0+2\beta_0 b_2+\beta_1 b_1 \quad (23)$$

$$c_2+2c_1=\alpha_0 a_2+2\alpha_1 a_1+\beta_0 b_3+2\beta_1 b_2 \quad (24)$$

$$c_2=\alpha_1 a_2+\beta_1 b_3 \quad (25)$$

Note that $\alpha_0$, $\alpha_1$, $\beta_0$, $\beta_1$, the vector $a_1$ and the vector $c_1$ are unknown quantities in the simultaneous equations (22) through (25). It is, however, possible to solve $\alpha_0$ and $\beta_0$ from the equation (22). It is also feasible to solve $\alpha_1$ and $\beta_1$ from the equation (25).

Furthermore, at this moment the equations (23) and (25) are transformed, thereby obtaining the following formulae:

$$c_1-\alpha_0 a_1 = \tfrac{1}{2}(\alpha_1 a_0+2\beta_0 b_2+\beta_1 b_1-c_0) \quad (26)$$

$$c_1-\alpha_1 a_1 = \tfrac{1}{2}(\alpha_0 a_2+\beta_0 b_3+2\beta_1 b_2-c_2) \quad (27)$$

Hence, the formulae (26) and (27) can be transformed into a determinant expressed as follows:

$$\begin{bmatrix} 1-\alpha_0 \\ 1-\alpha_1 \end{bmatrix}\begin{bmatrix} c_1 \\ a_1 \end{bmatrix} = \frac{1}{2}\begin{bmatrix} \alpha_1 a_0+2\beta_0 b_2+\beta_1 b_1-c_0 \\ \alpha_0 a_2+\beta_0 b_3+2\beta_1 b_2-c_2 \end{bmatrix} \quad (28)$$

The unknown quantities $a_1$ and $c_1$ can be obtained by solving this determinant.

Set to satisfy the thus obtained control edge vectors $a_1$ and $c_1$ are any one of the connection internal control point vectors $P_{(11)}{}^{u=0}$, $P_{(11)}{}^{v=0}$, $P_{(11)1}{}^{w=0}$ and any one of the vectors $P_{(11)2}{}^{u=0}$, $P_{(11)2}{}^{v=0}$, $P_{(11)2}{}^{w=0}$ with respect to the common boundary COM of the respective trilateral patch vectors $T_{(u,v)1}$ and $T_{(u,v)2}$. Reeffected at the same time is an interpolative computation of the free-form surface stretched to the patch vectors $T_{(u,v)1}$ and $T_{(u,v)2}$ by suing those connection internal control point vectors $P_{(11)1}$ and $P_{(11)2}$.

In this way, the first and second patch vectors $R_{(u,v)1}$ and $T_{(u,v)2}$ connected to each other through the common boundary COM are connectable smoothly under the conditions for the tangent plane continuity.

The tangent plane is herein defined as a plane formed by the u-and-v-directional tangent vectors at the respective points on the common boundary. Hence, when the tangent planes of the first and second patch vectors $T_{(u,v)1}$ and $T_{(u,v)2}$ are identical, the tangent plane continuity conditions are established.

Note that a tangent plane continuity condition about an arbitrary point vector $P_{(ov)}$ on the common boundary COM is determined as shown in FIG. 2. To be specific, in connection with the patch vector $T_{(u,v)1}$, a normal vector $n_1$ of a tangent vector $H_a$ in a direction (i.e., the u-direction) across the common boundary COM and a tangent vector $H_b$ in a direction (i.e., the v-direction) along the common boundary COM is expressed by the following formula:

$$n_1=H_a\times H_b \quad (29)$$

Expressed similarly with respect to the patch vector $T_{(u,v)2}$ is a normal vector $n_2$ of a tangent vector $H_c$ in the direction across the common boundary COM and the tangent vector $H_b$ in the direction along the common boundary COM.

$$n_2=H_c\times H_b \quad (30)$$

To provide the tangent plane continuity under such conditions, the tangent vectors $H_1$, $H_b$ and $H_c$ have to exist on the same plane. As a result, the respective normal vectors $n_1$ and $n_2$ point to the same direction.

Incidentally, the tangent vectors $H_1$, $H_b$ and $H_c$ are herein given as shown in the following formulae:

$$H_a = \frac{\partial T_{(u,v)1}}{\partial u} \quad (31)$$

$$H_b = \frac{\partial T_{(u,v)1}}{\partial v} \quad (32)$$

$$H_c = \frac{\partial T_{(u,v)2}}{\partial u} \quad (33)$$

When framing the surface assuming an extremely skewed geometry and having not regularity of array of specified points in this manner, the surface is stretched by use of the trilateral patch vector $T_{(u,v)}$ expressed by the cubic Bezier-formula. A much finer surface is thereby mathematically expressible.

The first and second trilateral patch vectors $T_{(u,v)1}$ and $T_{(u,v)2}$ which are connected with the common boundary COM being interposed therebetween under the tangent plane continuity conditions by such a free-form data generating method. On this occasion, the formula (28) is not solved in some cases.

This takes place when, for instance, control edge vectors $b_1$, $b_2$ and $b_3$ on the common boundary COM exist on the same plane, and if the first and second trilateral patch vectors $T_{(u,v)1}$ and $T_{(u,v)2}$ are absolutely symmetrically disposed with respect to the plane including the control edge vectors $b_1$, $b_2$ and $b_3$.

Namely, constants $\alpha_0$ and $\alpha_1$ of the scalar function $\alpha(v)$ described in the formula (19) are equalized ($\alpha_0=\alpha_1$) at this time. As a result, in the determinant of (2×2) matrix of the left side of the formula (28), as shown by the following formula, a value becomes [0].

$$det\begin{bmatrix} 1-\alpha_0 \\ 1-\alpha_1 \end{bmatrix} = 0 \quad (34)$$

The formula (28) itself eventually becomes indeterminate, with the result that the control edge vectors $a_1$ and $c_1$ can not be obtained.

For this reason, the constants $\alpha_0$ and $\alpha_1$ are set such as $\alpha_0=\alpha_1=\alpha$. The formula (22) is substituted into the formula (23), and the following formula is obtained.

$$2c_1-2\alpha a_1=2\beta_0 b_2+\beta_1 b_1-\beta_0 b_1 \quad (35)$$

At the same time, the formula (25) is substituted into the formula (24), whereby the following formula is obtained:

$$2c_1-2\alpha a_1=\beta_0 b_3+2\beta_1 b_2-\beta_1 b_3 \quad (36)$$

Then, the following formula is drawn out from the formulae (35) and (36).

$$2\beta_0 b_2+\beta_1 b_1-\beta_0 b_1 = \beta_0 b_3+2\beta_1 b_2-\beta_1 b_3 \; (\beta_0-\beta_1)(b_1-2b_2+b_3)=0 \quad (37)$$

In this formula, when $\beta_0=\beta_1$, $\beta_0=\beta_1=\beta$. Then, the following formula is obtained from the formula (35).

$$c_1=\alpha a_1+\beta b_2 \quad (38)$$

Obtained similarly from the formula (36) is the following formula:

$$c_1=\alpha a_1+\beta b_2 \quad (39)$$

In this way, when $\alpha_0=\alpha_1$ and $\beta_0=\beta_1$, the vectors $a_1$, $b_2$ and $c_1$ are arranged to exist on the same plane. The first and second trilateral patch vectors $T_{(u,v)1}$ and $T_{(u,v)2}$ are connectable under the tangent plane continuity conditions.

In the formula (36), when $\alpha_0=\alpha_1$ and $\beta_0=\beta_1$, the following equation is to be established:

$$b_1-2b_2+b_3=0 \quad (40)$$

On this assumption, the first and second trilateral patch vectors $T_{(u,v)1}$ and $T_{(u,v)2}$ are connectable under the tangent plane continuity conditions.

In the formula (28), as discussed above, however, when there arises such a case that $\alpha_0=\alpha_1$, it is required to retransform each of the control edge vectors $a_1$, $b_2$, $c_1$ and $b_1$, $b_2$, $b_3$ to satisfy the above-mentioned conditions described in the formulae (39) and (40). Troublesome labors are caused in designing by the designer. This implies that the facility is not yet sufficient.

As a matter of fact, when arbitrarily transforming the control edge vectors $a_1$, $b_2$, $c_1$ and $b_1$, $b_2$, $b_3$ in the manner described above, the free-form surface geometry itself expressed by the first and second trilateral patch vectors $T_{(u,v)1}$ and $T_{(u,v)2}$ is transformed correspondingly. A problem still exists, wherein it is impossible to avoid such a possibility that the first and second trilateral patch vectors $T_{(u,v)1}$ and $T_{(u,v)2}$ are connected in a geometry contrary to the intention of the designer.

Besides, when expressing the free-form surface with the trilateral patch vector $T_{(u,v)}$ in this manner, the designer depicts a geometry of the object with aggregates of triangles by connecting all the points of the cubic geomatic data consisting of sets of coordinate data. It is required that the triangles adjacent to each other be reconnected to satisfy the tangent plane continuity conditions described above. This eventually leads to a problem in which the troublesome designing operation by the designer is also needed.

DISCLOSURE OF THE INVENTION

It is a primary object of the present invention to provide a free-form surface generating method capable of smoothly connecting first and second trilateral patches assuming any states and also connecting the first and second trilateral patches in conformity with setting conditions by selecting a predetermined condition on the occasion of connection.

To obviate the above-mentioned problems, according the first invention, there is provided a free-form surface generating method of creating a free-form surface by forming a multiplicity of frame spaces encircled by boundary curves by frame processing and stretching trilateral patches over the frame spaces. In this free-form surface generating method, when smoothly reconnecting first and second trilateral patch vectors $T_{(u,v)1}$ and $T_{(u,v)2}$ connected to each other with a common boundary COM being interposed therebetween, and when specifying a transformation of the common boundary COM, a common boundary $COM_{NEW}$ is arbitrarily transformed. At the same moment, the first and second trilateral patch vectors $T_{(u,v)1}$ and $T_{(u,v)2}$ are connected in such a state as to keep a relation in surface geometry thereof. When specifying non-transformation of the common boundary COM, the curvilinear configuration of the common boundary COM is maintained. At the same time, the surface geometries of the first and second trilateral patch vectors $T_{(u,v)1}$ and $T_{(u,v)2}$ are arbitrarily transformed. The first and second trilateral patch vectors $T_{(u,v)1}$ and $T_{(u,v)2}$ are thereby connected.

According to the present invention, there is provided a free-form surface generating method of creating a free-form surface by forming a multiplicity of frame spaces encircled by boundary curves by frame processing and stretching trilateral patches expressed by predetermined vector functions over the frame spaces. In this free-form surface generating method, when smoothly reconnecting the first and second trilateral patch vectors $T_{(u,v)1}$ and $T_{(u,v)2}$ connected with the common boundary COM being interposed therebetween, the first and second trilateral patch vectors $T_{(u,v)1}$ and $T_{(u,v)2}$ are connected to satisfy only conditions under which a first tangent vector $b_j$ along the common boundary COM at an arbitrary point on the common boundary COM, and second and third tangent vectors $a_j$ and $c_j$ across the common boundary COM and directed to the first and second trilateral patch vectors $T_{(u,v)1}$ and $T_{(u,v)2}$ exist invariably on the same plane.

According to the present invention, if the transformation of the common boundary COM is specified, the common boundary $COM_{NEW}$ is arbitrarily transformed. At the same moment, the first and second trilateral patch vectors $T_{(u,v)1}$ and $T_{(u,v)2}$ are connected while keeping a relation in surface geometry. Whereas if the non-transformation of the common boundary COM is specified, the curvilinear configuration of the common boundary COM is maintained. Simultaneously, the surface geometries of the first and second trilateral vectors $T_{(u,v)1}$ and $T_{(u,v)2}$ are arbitrarily transformed, whereby the first and second trilateral patch vectors $T_{(u,v)1}$ and $T_{(u,v)2}$ are connected. The surface geometries of the first and second trilateral patch vectors $T_{(u,v)1}$ and $T_{(u,v)2}$ are selectable by specifying whether the common boundary COM is transformed or not.

When smoothly reconnecting the first and second trilateral patch vectors $T_{(u,v)1}$ and $T_{(u,v)2}$ connected with the common boundary COM being interposed therebetween, the first and second trilateral patch vectors $T_{(u,v)1}$ and $T_{(u,v)2}$ can be connected invariably, surely and smoothly by satisfying only conditions under which the first tangent vector $b_j$ along the common boundary COM at an arbitrary point on the common boundary COM, and the second and third tangent vectors $a_j$ and $c_j$ across the common boundary COM and directed to the first and second trilateral patch vectors $T_{(u,v)1}$ and $T_{(u,v)2}$ exist invariable on the same plane.

According to the present invention, when smoothly reconnecting the first and second trilateral patches connected with the common boundary being interposed therebetween, the common boundary is transformed. At the same time, the first and second trilateral patches are smoothly reconnected while keeping the geometric relation of the first and second trilateral patches. Alternatively the first and second trilateral patches are smoothly reconnected by transforming the geometric relation of the first and second trilateral patches without transforming the common boundary. With this arrangement, the surface geometries of the first and second trilateral patches after being connected can be selected. Thus, it is possible to actualize the free-form surface generating method capable of remarkably improving the facility.

Further, the first and second trilateral patches connected with the common boundary being interposed therebetween are reconnected to satisfy only the conditions under which the first tangent vector along the common boundary at the arbitrary point on the common boundary, and the second and third tangent vectors directed to the first and second trilateral patches exist invariably on the same plane. With this arrangement, it is possible to attain the free-form surface generating method capable of connecting the first and second trilateral patches more smoothly even when the first and second trilateral patches assume any surface geometries.

Another object of the present invention is to provide a free-form surface data generating method capable of generating free-form surface data of a predetermined object expressed by aggregates of trilateral patches from three-dimensional geometric data of the predetermined object expressed by a plurality of point groups existing on a plurality of parallel planes.

To obviate the foregoing problems, according to the present invention, a plurality of triangles are formed by connecting, without excess and deficiency, a plurality of point vectors $P_{00}$–$P_{07}$, $P_{10}$–$P_{18}$, $P_{20}$–$P_{25}$, $P_{30}$–$P_{36}$ and $P_{40}$–$P_{47}$ in three-dimensional geometric data $DT_{TD}$ in which a predetermined object 5 is expressed by a plurality of point groups existing on a parallel planes in accordance with projected points $TP_{00}$–$TP_{07}$, $TP_{10}$–$TP_{18}$, $TP_{20}$–$TP_{25}$, $TP_{30}$–$TP_{36}$ and $TP_{40}$–$TP_{47}$ projected on planes orthogonal to the plurality of parallel planes. Generated are control point vectors $P_{A0}$ and $P_{B0}$ representing the boundary curves of the trilateral patch vectors $T_{(u,v)}$ with the plurality of triangles serving as frames. Generated are free-form surface data in which the predetermined object 5 is expressed by the aggregates of the trilateral patch vectors $T_{(u,v)}$.

According to the present invention, the free-form surface data are generated by generating the control point vectors $P_{A0}$ and $P_{B0}$ representing the boundary curves of the trilateral patch vectors $T_{(u,v)}$ with the plurality of triangles serving as frames, these triangles being formed by connecting a plurality of point vectors $P_{00}$–$P_{07}$, $P_{10}$–$P_{18}$, $P_{20}$–$P_{25}$, $P_{30}$–$P_{36}$ and $P_{40}$–$P_{47}$ in the three-dimensional geometric data $DT_{TD}$ without excess and deficiency. With this arrangement, it is feasible to easily generate the free-form surface data composed of the aggregates of trilateral patches from the three-dimensional geometric data $DT_{TD}$.

Generated further according to the present invention are control points representing the boundary curves of the trilateral patches with the plurality of triangles serving as frames, the triangles being formed by connecting, without excess and deficiency, the plurality of points in the three-dimensional geometric data in which the predetermined object is expressed by the plurality of point groups existing on the plurality of parallel planes. With this arrangement, it is possible to readily generate the free-form surface data consisting of the aggregates of trilateral patches from the three-dimensional geometric data. Thus, the free-form surface data generating method capable of remarkably improving the facility to the designer can be thereby actualized.

Other objects and advantages of the present invention will become apparent during the following discussion taken in conjunction with the accompanying drawings.

BEST MODE FOR CARRYING OUT THE INVENTION

Description of the Preferred Embodiments

One embodiment of the present invention will hereinafter be described in detail with reference to the accompanying drawings.

Figure 1:
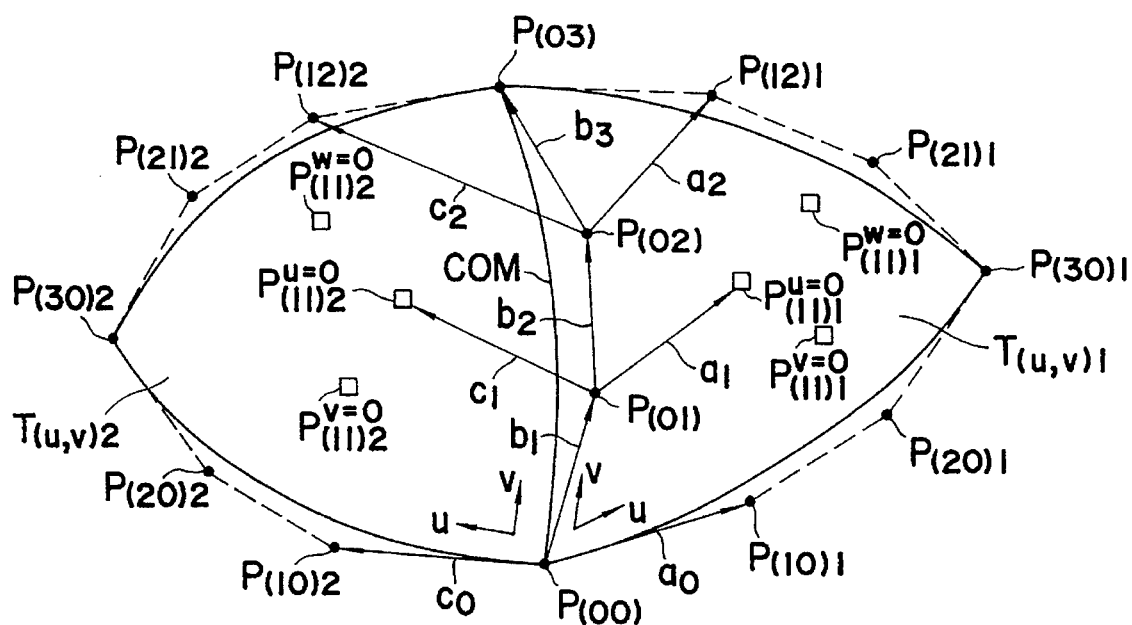
FIG. 1 is a schematic diagram illustrating trilateral patches and connections thereof.
Figure 2:
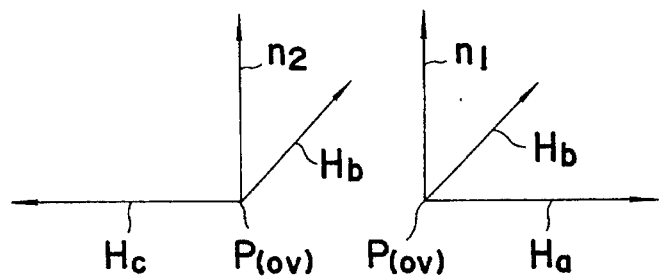
FIG. 2 is a schematic diagram showing connective conditions of tangent plane continuity.
Figure 3:
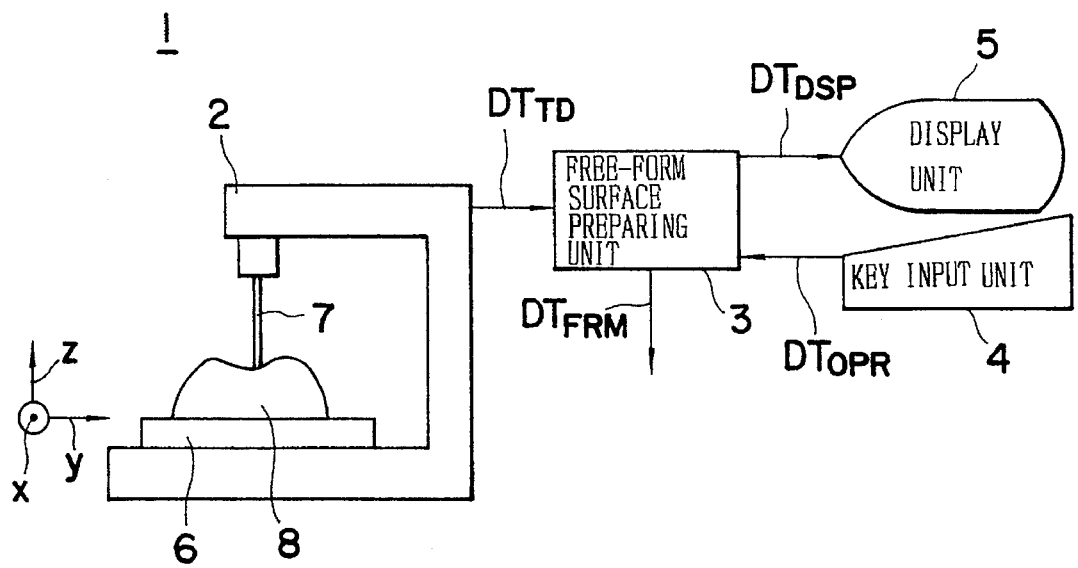
FIG. 3 is a block diagram depicting a device for creating a free-form surface.

(1) Architecture of a device for creating a free-form surface:

Designated generally at 1 in FIG. 3 is a free-form surface preparing device for executing a method of generating free-form surface data according to the present invention. The free-form surface generating device 1 is constructed of: a so-called contact type three-dimensional measuring unit 2 serving as a data input means; a microcomputer-based free-form surface generating unit 3 for generating the free-form surface data on the basis of three-dimensional geometry data $DT_{TD}$ obtained from the three-dimensional measuring unit 2; a key input unit 4 serving as an operation input means handled by a designer; and a display unit 5 for displaying the free-form surface data.

The three-dimensional measuring unit 2 is composed of an X-Y table 6 for generating X-and-Y coordinate values by moving in X-and-Y-directions at predetermined intervals and a probe 7 for generating Z coordinate values by moving in a Z-direction. The measuring unit 2 effects a measurement by mounting a measurement object 8 formed of a mockup or the like on the X-Y table 6. Generated are three-dimensional geometric data $DT_{TD}$ consisting of sets of X-Y-Z coordinate data representing points in a three-dimensional space. The data $DT_{TD}$ are transmitted to the free-form surface generating unit 3.

In fact, the free-form surface generating unit 3 connects the respective points in the thus obtained three-dimensional geometric data $DT_{TD}$ without excess and deficiency. The free-form surface generating unit 3 depicts the measurement object 8 with a plurality of triangles. Generated are control points representing boundary curves of trilateral patches, with these plural triangles serving as a frame. The free-form surface data for representing the measurement object 8 with aggregates of trilateral patches are thus generated.

Subsequent to this process, a CPU of the free-form surface generating unit 3 executes procedures of trilateral patch connection processing in predetermined timings specified by the designer. The CPU reconnects the trilateral patches connected with a common boundary being interposed therebetween to satisfy conditions for tangent plane continuity.

Thus generated free-form surface data $DT_{FRM}$ are displayed as display data $DT_{DSP}$ on the display unit 5. The free-form surface data are transmitted to a free-form surface processing data generating unit (not illustrated) conceived as, e.g., a CAD/CAM system, corresponding to manipulations of the designer who operates the key input unit 4. Free-form surface processing data generated by the free-form surface processing data generating unit are sent to a machining center or the like.

Figure 4A:
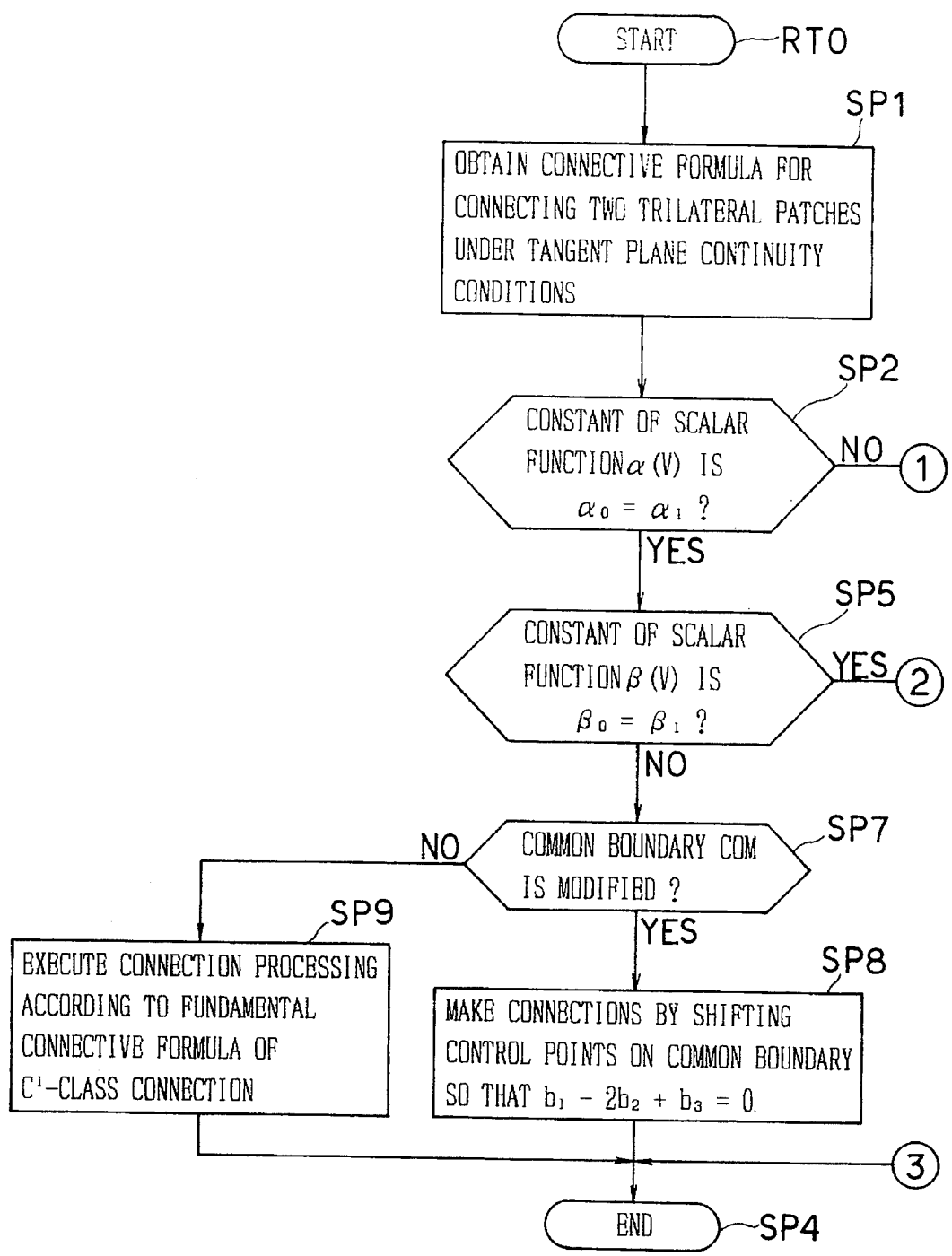
FIGS. 4A and 4B are a flowchart showing a first embodiment of a method of generating free-form data according to the present invention.
Figure 4B:
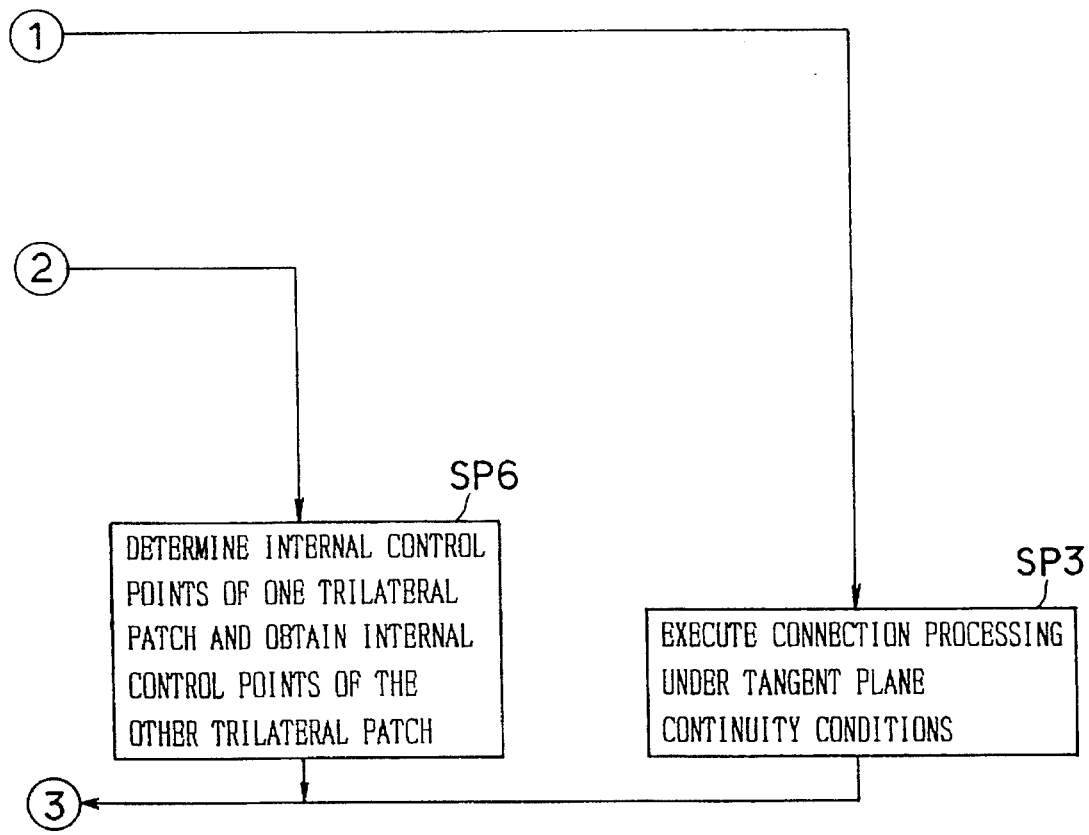

(2) Free-form surface data generating method in the first embodiment:

In the case of the first embodiment, the CPU of the free-form surface generating unit 3 executes trilateral patch connection processing procedures RT0 shown in FIG. 4A and 4B in response to operation inputs $DT_{OPR}$ of the designer who uses the key input unit 4.

More specifically, the designer uses the key input unit 4 to execute an operation input to reconnect the trilateral patches created automatically when inputting the three-dimensional geometric data $DT_{TD}$. Thereupon, the CPU of the free-form surface generating unit 3 enters the trilateral patch connection processing procedures RT0 and, in the next step SP1, obtains a connection formula for connecting, as stated in the formulae (9) through (25), first and second trilateral patch vectors $T_{(u,v)1}$ and $T_{(u,v)2}$ under the tangent plane continuity conditions. Using formulae (22)–(25), constants $\alpha_0$, $\alpha_1$ and $\beta_0$, $\beta_1$ of scalar functions $\alpha(v)$ and $\beta(v)$ of the formula (20) are detected.

Subsequently, the CPU judges whether or not the constants $\alpha_0$ and $\alpha_1$ stated in the formula (19) are equal ($\alpha_0=\alpha_1$) in the next step SP2. After obtaining a negative result (viz. $\alpha_0 \ne \alpha_1$), the operation moves to a step SP3, wherein the formulae (26) through (28) are solved to detect the control edge vectors $a_1$ and $c_1$.

The CPU sets connection internal control point vectors $P_{(11)1}$ and $P_{(11)2}$ for the common boundary COM of the respective trilateral patch vectors $T_{(u,v)1}$ and $T_{(u,v)2}$ to satisfy the control edge vectors $a_1$ and $c_1$. Effected is an interpolative computation of a free-form surface stretched to the first and second trilateral patch vectors $T_{(u,v)1}$ and $T_{(u,v)2}$ by employing these connection internal control point vectors $P_{(11)1}$ and $P_{(11)2}$.

The first and second trilateral patch vectors $T_{(u,v)1}$ and $T_{(u,v)2}$ connected through the common boundary COM are smoothly connected under the tangent plane continuity conditions. The operation shifts to the next step SP4, wherein the trilateral patch connection processing procedures RT0 come to an end.

The CPU, after obtaining an affirmative result in the step SP2 (i.e., $\alpha_0=\alpha_1$), moves to the next step SP5 and judges whether or not the constants $\beta_0$ and $\beta_1$ stated in the formula (20) are equal ($\beta_0=\beta_1$). If an affirmative result is acquired, the CPU moves to a step SP6, wherein the connection internal control point vector $P_{(11)1}$ of the one, e.g., first trilateral patch vector $T_{(u,v)1}$ is arbitrarily set. Obtained correspondingly is the connection internal control point vector $P_{(11)2}$ of the other second trilateral patch vector $T_{(u,v)2}$.

More specifically, in this case the constants $\alpha_0$, $\alpha_1$ and $\beta_0$, $\beta_1$ of the scalar functions $\alpha(v)$ and $\beta(v)$ in the formulae (19) and (20) are set such as $\alpha_0=\alpha_1=\alpha$ and $\beta_0=\beta_1=\beta$. Based on the following formula similar to the formulae (38) and (39);

$$c_1 = \alpha a_1 + \beta b_2 \tag{41}$$

The control edge vector $a_1$ is arbitrarily set. The control edge vector $c_1$ is correspondingly obtained.

Then, the CPU sets the connection internal control points vectors $P_{(11)1}$ and $P_{(11)2}$ for the common boundary COM of the trilateral patch vectors $T_{(u,v)1}$ and $T_{(u,v)2}$ to satisfy the control edge vectors $a_1$ and $c_1$. At the same moment, the CPU performs the interpolative computation of the free-form surface stretched to the first and second trilateral patch vectors $T_{(u,v)1}$ and $T_{(u,v)2}$ by using these connection internal control point vectors $P_{(11)1}$ and $P_{(11)2}$.

The first and second trilateral patch vectors $T_{(u,v)1}$ and $T_{(u,v)2}$ which have thus been connected through the common boundary COM are smoothly connected under the tangent plane continuity conditions. The CPU shifts to the next step SP4, wherein the trilateral patch connection processing procedures RT0 are terminated.

Besides, the CPU, if a negative result is obtained in the above-mentioned step SP5 (i.e., $\beta_0 \ne \beta_1$), moves to the next step SP7. The CPU then waits for a specifying input given from the designer, showing whether the common boundary COM is modified or not.

Figure 5:
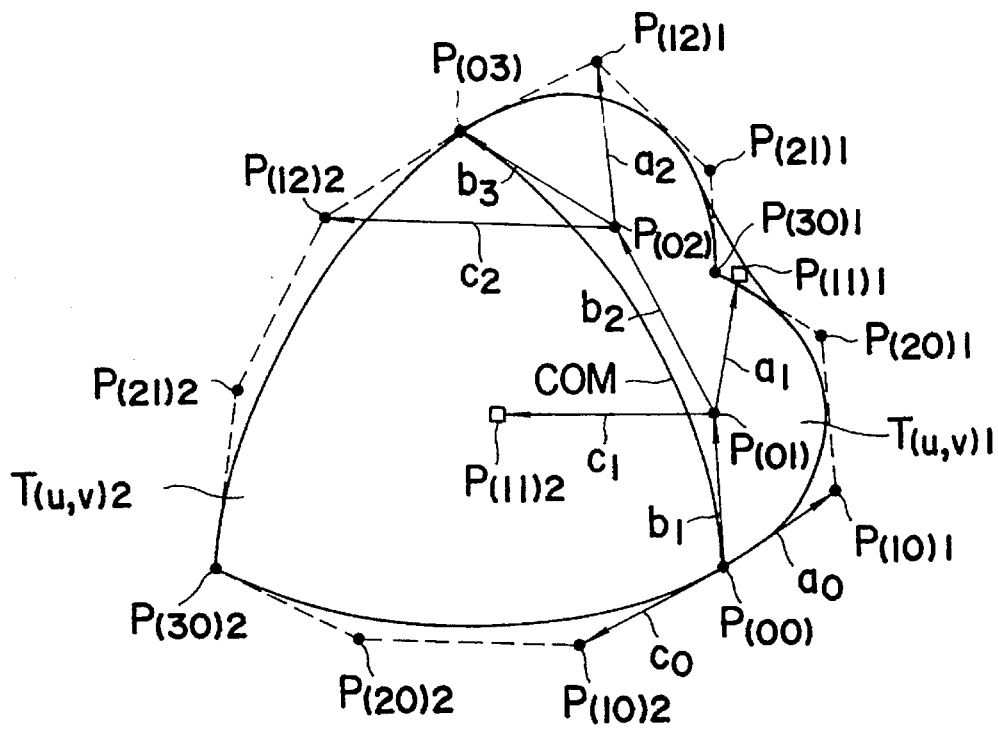
FIG. 5 is a schematic diagram showing a connective state of symmetric trilateral patches.

Incidentally, as shown in FIG. 5, the constants $\alpha_0$, $\alpha_1$ and $\beta_0$, $\beta_1$ of the scalar functions $\alpha(v)$ and $\beta(v)$ of the formulae (19) and (20) actually have relations such as $\alpha_0=\alpha_1$ and $\beta_0 \ne \beta_1$. In this case, for example, as a semispherical surface is divided by a factor of 4 by the first and second trilateral patch vectors $T_{(u,v)1}$ and $T_{(u,v)2}$, the shape is based on surface geometries which are absolutely symmetric with respect the plane including the control edge vectors $b_1$, $b_2$ and $b_3$ on the common boundary COM.

In this state, the CPU of the free-form surface generating unit 3 sends, to the display unit 5, a message as data $DT_{DSP}$ inquiring whether the common boundary COM is modified or not. Correspondingly, the designer executes a specifying input $DT_{OPR}$ in response to the message displayed thereon by use of the key input unit 4.

As a matter of fact, the CPU moves to the next step SP8 on receiving the affirmative result in the step SP7 (viz., this implies that the designer given an instruction to modify the common boundary COM). The CPU then shifts control point vectors $P_{(01)}$ and $P_{(02)}$ on the common boundary COM so that the control edge vectors $b_1$, $b_2$ and $b_3$ on the common boundary COM satisfy a condition given by the following formula similar to the formula (40):

$$b_1 - 2b_2 + b_3 = 0 \tag{42}$$

Figure 6:
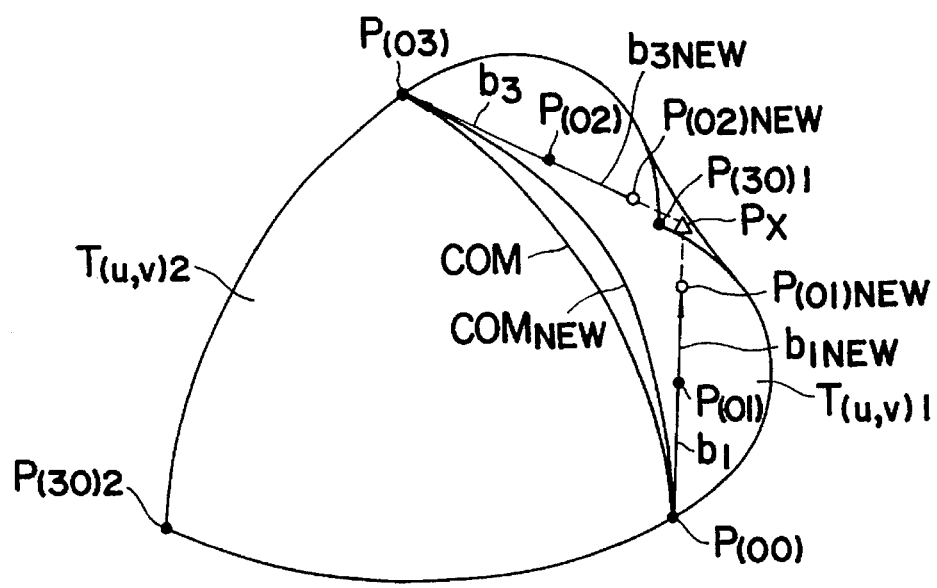
FIG. 6 is a schematic diagram a method of transforming a common boundary.

In fact, as illustrated in FIG. 6, even when shifting the control point vectors $P_{(01)}$ and $P_{(02)}$, there is maintained such a relation that the control edge vectors $a_0$, $b_1$, $c_0$ and $a_2$, $b_3$, $c_2$ exist on the same plane. Hence, in the case of this embodiment, the control edge vectors $b_1$ and $b_3$ are scalar-multiplied.

Namely, as shown in the following formulae;

$$b_{1NEW} = P_i + t_1 b_1 \tag{43}$$

$$b_{3NEW} = P_j + t_3 b_3 \tag{44}$$

The control edge vectors $b_1$ and $b_3$ are extended by effecting the scalar-multiplication by a predetermined quantity respectively from the control point vectors $P_{(01)}$ (this is shown by a vector $P_i$ in the formula (43)) and the control point vector $P_{(02)}$ (this is shown by a vector $P_j$ in the formula (44)). The resultantly extended control edge vectors $b_{1NEW}$ and $b_{3NEW}$ are replaced as in the following formula:

$$P_i + t_1 b_1 = P_j + t_3 b_3 \tag{45}$$

An intersection vector of the control edge vectors $b_{1NEW}$ and $b_{3NEW}$ is obtained. This formula (45) is in effect can be transformed into the following formula:

$$t_1 b_1 - t_3 b_3 = P_j - P_i = P_{ji} \tag{46}$$

Let $(b_{1x}, b_{1y}, b_{1z})$, $(b_{3x}, b_{3y}, b_{3z})$ and $(P_{jix}, P_{jiy}, P_{jiz})$ be the inter three-dimensional space X-Y-Z coordinates of the control edge vectors $b_1$, $b_3$ and the control point vector $P_{ji}$. The formula (46) is expressible as a determinant shown by the following formula:

$$\begin{bmatrix} b_{1x} \\ b_{1x} \\ b_{1x} \end{bmatrix} t_1 + \begin{bmatrix} -b_{3x} \\ -b_{3x} \\ -b_{3x} \end{bmatrix} t_3 = \begin{bmatrix} P_{jix} \\ P_{jiy} \\ P_{jiz} \end{bmatrix} \tag{47}$$

Hence, this determinant is solved, thereby obtaining scalar quatities $t_1$ and $t_3$ representing distances between the control point vector $P_{(01)}$ and the intersection vector $P_x$ of the control edge vectors $b_{1NEW}$ and $b_{3NEW}$ and between $P_{(02)}$ and $P_x$, respectively. In this embodiment, the following formulae are given by using the scalar quantities $t_1$ and $t_3$:

$$b_{1NEW} = P_i + \tfrac{2}{3} t_1 b_1 \tag{48}$$

$$b_{3NEW} = P_j + \tfrac{2}{3} t_3 b_3 \tag{49}$$

As shown above, new control point vectors $P_{(01)NEW}$ and $P_{(02)NEW}$ are set in positions obtained by multiplying the scalar quantities; $t_1$ and $t_3$ by, e.g., $\tfrac{2}{3}$ from the control point vectors $P_{(01)}$ and $P_{(02)}$. A new common boundary $COM_{NEW}$ is obtained from the thus acquired new control point vectors $P_{(01)NEW}$, $P_{(02)NEW}$ and nodal vectors $P_{(00)}$, $P_{(03)}$.

Furthermore, in this embodiment, the first and second trilateral patch vectors $T_{(u,v)1}$ and $T_{(u,v)2}$ are connected under the tangent plane continuity conditions on the basis of the new common boundary $COM_{NEW}$. On this occasion, the formulae (35) and (36) are transformed into the following formula:

$$-2c_1 - 2\alpha a_1 = \beta_1 b_1 + \beta_0 b_3 \tag{50}$$

Given also is the following formula in which $(a_{1x}, a_{1y}, a_{1z})$ and $(c_{1x}, c_{1y}, c_{1z})$ are the inter three-dimensional space X-Y-Z coordinates of the control edge vectors $a_1$ and $c_1$:

$$a_{1x}^2 + a_{1y}^2 + a_{1z}^2 = c_{1x}^2 + c_{1y}^2 + c_{1z}^2 \tag{51}$$

These formulae are solved, whereby magnitudes of the control edge vectors $a_1$ and $c_1$ are equalized. Besides, the control edge vectors $a_1$, $c_1$ and $b_1$ are set to satisfy the following formula.

$$(c_1 - a_1) \cdot b_1 = 0 \tag{52}$$

Simultaneously, the control edge vectors $a_1$, $c_1$ and $b_3$ are set to meet the following formula.

$$(c_1 - a_1) \cdot b_3 = 0 \tag{53}$$

The control edge vectors $a_1$ and $c_1$ are orthogonal to the control edge vectors $b_1$ and $b_3$. The connection internal control point vectors $P_{(11)1}$ and $P_{(11)2}$ are thereby disposed in symmetric positions with respect to the plane including the control edge vectors $b_1$, $b_2$ and $b_3$.

Figure 7:
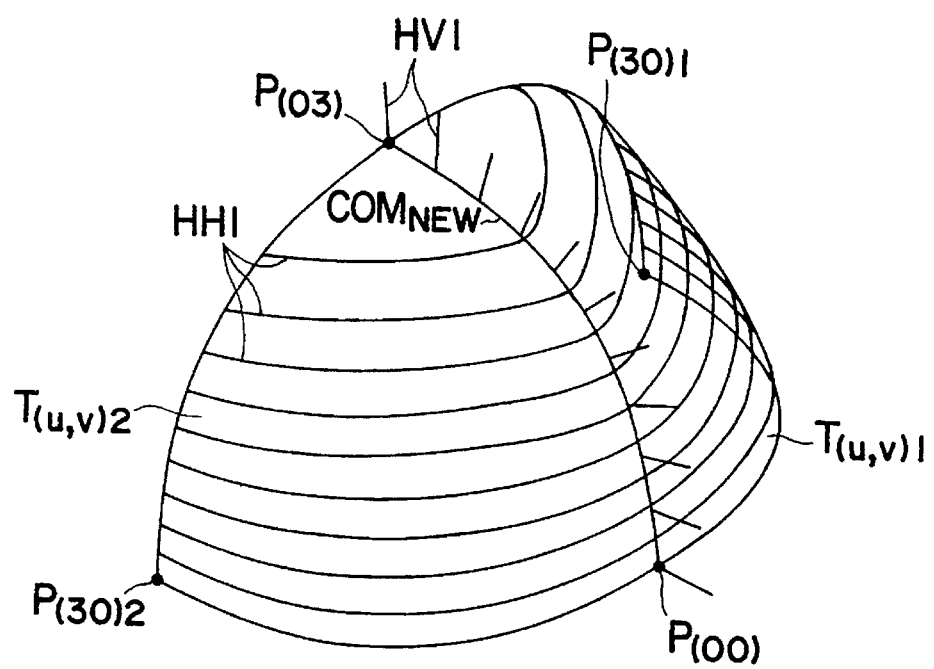
FIG. 7 is a schematic diagram showing a display example of two trilateral patches connected under conditions for tangent plane continuity.

Note that as illustrated in FIG. 7, the thus connected first and second trilateral patch vectors $T_{(u,v)1}$ and $T_{(u,v)2}$, as is obvious from a representation of contours HH1, keep the symmetry of the surface geometry owing to setting of the new common boundary $COM_{NEW}$. Besides, those trilateral vectors are, as is apparent from a representation of normal vectors HV1, connected with the new common boundary $COM_{NEW}$ being interposed therebetween under the tangent plane continuity conditions.

The CPU thus connects the first and second trilateral patch vectors $T_{(u,v)1}$ and $T_{(u,v)2}$ under the tangent plane continuity conditions while maintaining the symmetry of the surface geometry. Thereafter, the CPU shifts to the next step SP4, and the trilateral patch connection processing procedures RT0 come to an end.

Also, the CPU, when obtaining a negative result in the above-mentioned step SP7 (namely, this implies that the designer does not modify the common boundary COM), moves to a step SP9 and executes the connection processing pursuant to so-called $C^1$-class connecting conditions drawn out from the fundamentals of the first-order differential continuity.

Actually, this $C^1$-class connection is conditioned by the fact that tangent vectors $a_i$, $c_i$ in the direction (i.e., the u-direction) across the common boundary COM and a tangent vector $b_i$ in the direction (viz., the v-direction) along the common boundary COM invariably exist on the same plane with respect to arbitrary points on the common boundary COM, whereby the tangent vectors $a_i$, $c_i$ and $b_i$ have a relationship of linear dependence with respect to each other. Hence, the tangent vectors $a_i$, $c_i$ and $b_i$ are expressed by the following formulae:

$$a_i = \left. \frac{\partial T_{(u,v)1}}{\partial u} \right|_{u=0} \begin{bmatrix} x_1 \\ y_1 \\ z_1 \end{bmatrix} \tag{54}$$

$$c_i = \left. \frac{\partial T_{(u,v)2}}{\partial u} \right|_{u=0} \begin{bmatrix} x_2 \\ y_2 \\ z_2 \end{bmatrix} \tag{55}$$

$$b_i = \left. \frac{\partial T_{(u,v)1}}{\partial v} \right|_{u=0} \begin{bmatrix} x_3 \\ y_3 \\ z_3 \end{bmatrix} \tag{56}$$

A determinant of a rank 3 which uses the X-Y-Z coordinates $(x_1, y_1, z_1)$, $(x_2, y_2, z_2)$ and $(x_3, y_3, z_3)$ of the tangent vectors $a_i$, $c_i$ and $b_i$ becomes a rank 2 or under. Namely, this implies that the value may, as will be expressed by the following formula, become [0].

$$det \begin{bmatrix} x_1 & y_1 & z_1 \\ x_2 & y_2 & z_2 \\ x_3 & y_3 & z_3 \end{bmatrix} = 0 \tag{57}$$

It is to be noted that the X-Y-Z coordinates $(x_1, y_1, z_1)$ of the tangent vector $a_i$ are expressed by the following formulae in combination with the v-directional parameter v and the X-Y-Z coordinates $(a_{0x}, a_{0y}, a_{0z})$, $(a_{1x}, a_{1y}, a_{1z})$ and $(a_{2x}, a_{2y}, a_{2z})$ of the control edge vectors $a_0$, $a_1$ and $a_2$.

$$x_1 = (1-v)^2 a_{0x} + 2(1-v)v a_{1x} + v^2 a_{2x} \tag{58}$$

$$y_1 = (1-v)^2 a_{0y} + 2(1-v)v a_{1y} + v^2 a_{2y} \tag{59}$$

$$z_1 = (1-v)^2 a_{0z} + 2(1-v)v a_{1z} + v^2 a_{2z} \tag{60}$$

In addition, the X-Y-Z coordinates $(x_2, y_2, z_2)$ of the tangent vector $c_i$ are expressed by the following formulae in combination with the v-directional parameter v and the X-Y-Z coordinates $(c_{0x}, c_{0y}, c_{0z})$, $(c_{1x}, c_{1y}, c_{1z})$ and $(c_{2x}, c_{2y}, c_{2z})$ of the control edge vectors $c_0$, $c_1$ and $c_2$.

$$x_2 = (1-v)^2 c_{0x} + 2(1-v)v c_{1x} + v^2 c_{2x} \tag{61}$$

$$y_2 = (1-v)^2 c_{0y} + 2(1-v)v c_{1y} + v^2 c_{2y} \tag{62}$$

$$z_2 = (1-v)^2 c_{0z} + 2(1-v)v c_{1z} + v^2 c_{2z} \tag{63}$$

Furthermore, the X-Y-Z coordinates $(x_3, y_3, z_3)$ of the tangent vector $b_i$ are so defined as to be expressed by the following formulae in combination with the v-directional parameter v and the X-Y-Z coordinates $(b_{1x}, b_{1y}, b_{1z})$, $(b_{2x}, b_{2y}, b_{2z})$ and $(b_{3x}, b_{3y}, b_{3z})$ of the control edge vectors $b_1$, $b_2$ and $b_3$.

$$x_3 = (1-v)^2 b_{1x} + 2(1-v)v b_{2x} + v^2 b_{3x} \tag{64}$$

$$y_3 = (1-v)^2 b_{1y} + 2(1-v)v b_{2y} + v^2 b_{3y} \tag{65}$$

$$z_3 = (1-v)^2 b_{1z} + 2(1-v)v b_{2z} + v^2 b_{3z} \tag{66}$$

Based on the properties of matrix, the determinant of the formula (57) can be herein transformed into the following formula:

$$\begin{bmatrix} x_1 & y_1 & z_1 \\ x_2 & y_2 & z_2 \\ x_3 & y_3 & z_3 \end{bmatrix} = x_1 x_2 x_3 \begin{bmatrix} 1 & \frac{y_1}{x_1} & \frac{z_1}{x_1} \\ 1 & \frac{y_2}{x_2} & \frac{z_2}{x_2} \\ 1 & \frac{y_3}{x_3} & \frac{z_3}{x_3} \end{bmatrix} = \tag{67}$$

$$x_1 x_2 x_3 \begin{bmatrix} 1 & \frac{y_1}{x_1} & \frac{z_1}{x_1} \\ 0 & \frac{y_2}{x_2} - \frac{y_1}{x_1} & \frac{z_2}{x_2} - \frac{z_1}{x_1} \\ 0 & \frac{y_3}{x_3} - \frac{y_1}{x_1} & \frac{y_3}{x_3} - \frac{z_1}{x_1} \end{bmatrix}$$

Therefore, the following formula may be established based on the theorem of Laplace's expansion in order that the value becomes [0] in this determinant.

$$det \begin{bmatrix} \frac{y_2}{x_2} - \frac{y_1}{x_1} & \frac{z_2}{x_2} - \frac{z_1}{x_1} \\ \frac{y_3}{x_3} - \frac{y_1}{x_1} & \frac{z_2}{x_3} - \frac{z_1}{x_1} \end{bmatrix} = 0 \tag{68}$$

Hence, the formula (68) is transformed, and the following formula is to be solved.

$$\left\{ \frac{(1-v)^2 c_{0y} + 2(1-v)v c_{1y} + v^2 c_{2y}}{(1-v)^2 c_{0x} + 2(1-v)v c_{1x} + v^2 c_{2x}} - \right. \tag{69}$$

$$\left. \frac{(1-v)^2 a_{0y} + 2(1-v)v a_{1y} + v^2 a_{2y}}{(1-v)^2 a_{0x} + 2(1-v)v a_{1x} + v^2 2x} \right\} \times$$

$$\left\{ \frac{(1-v)^2 b_{1z} + 2(1-v)v b_{2z} + v^2 b_{3z}}{(1-v)^2 b_{1x} + 2(1-v)v b_{2x} + v^2 b_{3x}} - \right.$$

$$\left. \frac{(1-v)^2 a_{0z} + 2(1-v)v a_{1z} + v^2 a_{2z}}{(1-v)^2 a_{0x} + 2(1-v)v a_{1x} + v^2 a_{2x}} \right\} -$$

$$\left\{ \frac{(1-v)^2 c_{0z} + 2(1-v)v c_{1z} + v^2 c_{2z}}{(1-v)^2 c_{0x} + 2(1-v)v c_{1x} + v^2 c_{2x}} - \right.$$

$$\left. \frac{(1-v)^2 a_{0z} + 2(1-v)v a_{1z} + v^2 a_{2z}}{(1-v)^2 a_{0x} + 2(1-v)v b_{1x} + v^2 b_{2x}} \right\} \times$$

$$\left\{ \frac{(1-v)^2 b_{1y} + 2(1-v)v b_{2y} + v^2 b_{3y}}{(1-v)^2 b_{1x} + 2(1-v)v b_{2x} + v^2 b_{3x}} - \right.$$

$$\left. \frac{(1-v)^2 a_{0y} + 2(1-v)v a_{1y} + v^2 a_{2y}}{(1-v)^2 a_{0x} + 2(1-v)v a_{1x} + v^2 a_{2x}} \right\} = 0$$

As discussed above, it is therefore possible to respectively obtain the X-Y-Z coordinates $(a_{1x}, a_{1y}, a_{1z})$ and $(c_{1x}, c_{1y}, c_{1z})$ of the control edge vectors $a_1$ and $c_1$ consisting of, as stated earlier, unknown quantities.

Incidentally, wherean arrangement is made with respect to v by actually expanding the formula (69), it is feasible to arrange according to such terms as $(1-v)^6$, $(1-v)^5 v$, $(1-v)^4 v^2$, $(1-v)^3 v^3$, $(1-v)^2 v^4$, $(1-v)v^5$, $v^6$. If a coefficient of each term is set to a value of [0]. Simultaneously, the constants prescribed by the common boundary COM—i.e., $(a_{0x}, a_{0y}, a_{0z})$, $(a_{2x}, a_{2y}, a_{2z})$, $(c_{0x}, c_{0y}, c_{0z})$, $(c_{2x}, c_{2y}, c_{2z})$, $(b_{1x}, b_{1y}, b_{1z})$, $(b_{2x}, b_{2y}, b_{2z})$ and $(b_{3x}, b_{3y}, b_{3z})$—are respectively substituted therein. From seven simultaneous equations obtained as a result of this substitution, the unknown quantities $a_{1x}$, $a_{1y}$, $a_{1z}$, $c_{1x}$, $c_{1y}$ and $c_{1z}$ can be calculated.

The CPU then sets the connection internal control point vectors $P_{(11)1}$ and $P_{(11)2}$ for the common boundary COM of the respective trilateral patch vectors $T_{(u,v)1}$ and $T_{(u,v)2}$ to satisfy the control edge vectors $a_1$ and $c_1$. At the same moment, the CPU performs the interpolative computation of a free-form surface stretched to the first and second trilateral patch vectors $T_{(u,v)1}$ and $T_{(u,v)2}$ by use of these connection internal control point vectors $P_{(11)1}$ and $P_{(11)2}$.

Figure 8:
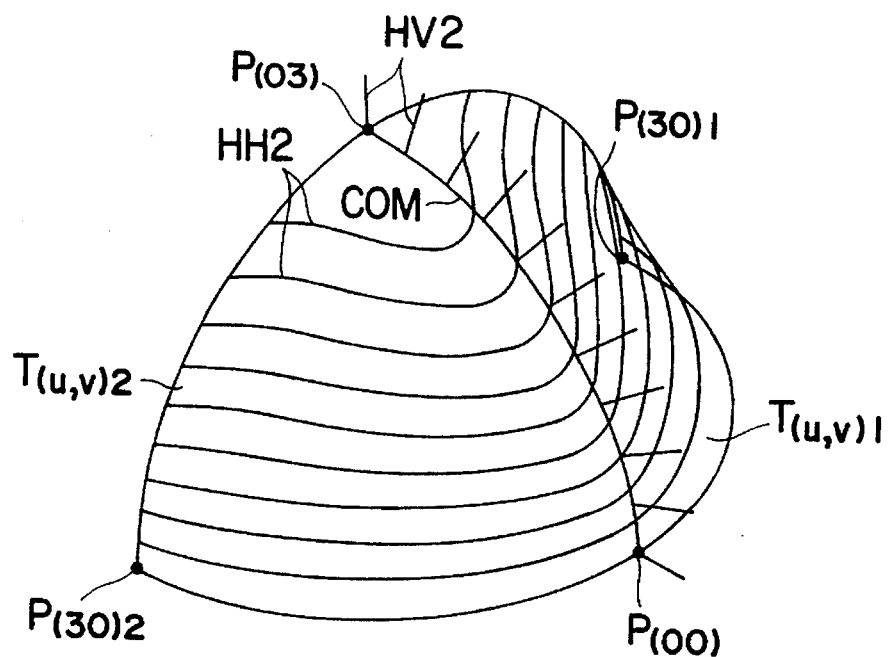
FIG. 8 is a schematic diagram showing a display example of two trilateral patches which are $C^1$-class-connected to each other.

Further, in this case, as illustrated in FIG. 8, it can be understood from the representation of the normal vectors HV2 that the first and second trilateral patch vectors $T_{(u,v)1}$ and $T_{(u,v)2}$ connected through the common boundary COM can be smoothly connected by the above-described method under first-order differential continuity conditions. It can be also understood from the representation of the contours HH2 that the symmetry of the surface geometry of the first and second trilateral patch vectors $T_{(u,v)1}$ and $T_{(u,v)2}$ is not maintained.

Thus, the first and second trilateral patch vectors $T_{(u,v)1}$ and $T_{(u,v)2}$ connected through the common boundary COM are smoothly connected under the first-order differential continuity conditions without transforming the common boundary COM. The operation moves to the next step SP4, and the trilateral patch connection processing procedures RT0 are finished.

According to the method discussed above, the first and second trilateral patches connected with the common boundary being interposed therebetween are smoothly reconnected. On this occasion, whether or not the designer connects the those patches by transforming the common boundary is specifiable. It is therefore possible to actualize the free-form surface generating method capable of selecting the arrangement that the common boundary is transformed in accordance with an intention of the designer, and the first and second trilateral patches are smoothly reconnected while keeping the geometric relation thereof; or alternatively, the first and second trilateral patches are smoothly reconnected while keeping no geometric relatlation thereof without transforming the common boundary. Thus, the facility to the designer can be remarkably improved.

Based on the method discussed above, the first and second trilateral patches are smoothly reconnected with the common boundary being interposed therebetween under the first-order differential continuity conditions. The first and second trilateral patches can be thereby smoothly reconnected even if the surface geometries of the first and second patches take any shapes.

(3) Modification of the first embodiment (3-1) There has been described so far the embodiment shown in FIGS. 3 to 8, wherein the geometry of the mockup or the like is measured by the three-dimensional measuring unit in advance of connecting the trilateral patches; and the free-form surface data in which the frame space is expressed by the aggregates of trilateral patches are prepared from the three-dimensional geometric data obtained as a result of the foregoing measurement. The present invention is not, however, limited to this method. The same effects as those in the above-mentioned embodiment are attainable by the designer preparing the free-form surface data with the aid of the key input means or the like.

(3-2) The embodiment shown in FIGS. 3 to 8 has dealt with a case where the trilateral patches expressed by the cubic Bezier formula are stretched over the frame space according to the present invention. The degree of the mathematical formula is not, however, limited to this. The Bezier formula of degree four or above may be employed.

(3-3) Given in the embodiment of FIGS. 3 to 8 was an explanation about a case where the trilateral patches expressed by the Bezier formula are stretched over the frame space. The mathematical formula is not, however, limited to this expression but may adopt other vector functions such as a B-spline type, a Coons type and a Furgason type.

(4) Method of generating the free-form surface data in a second embodiment

Figure 9:
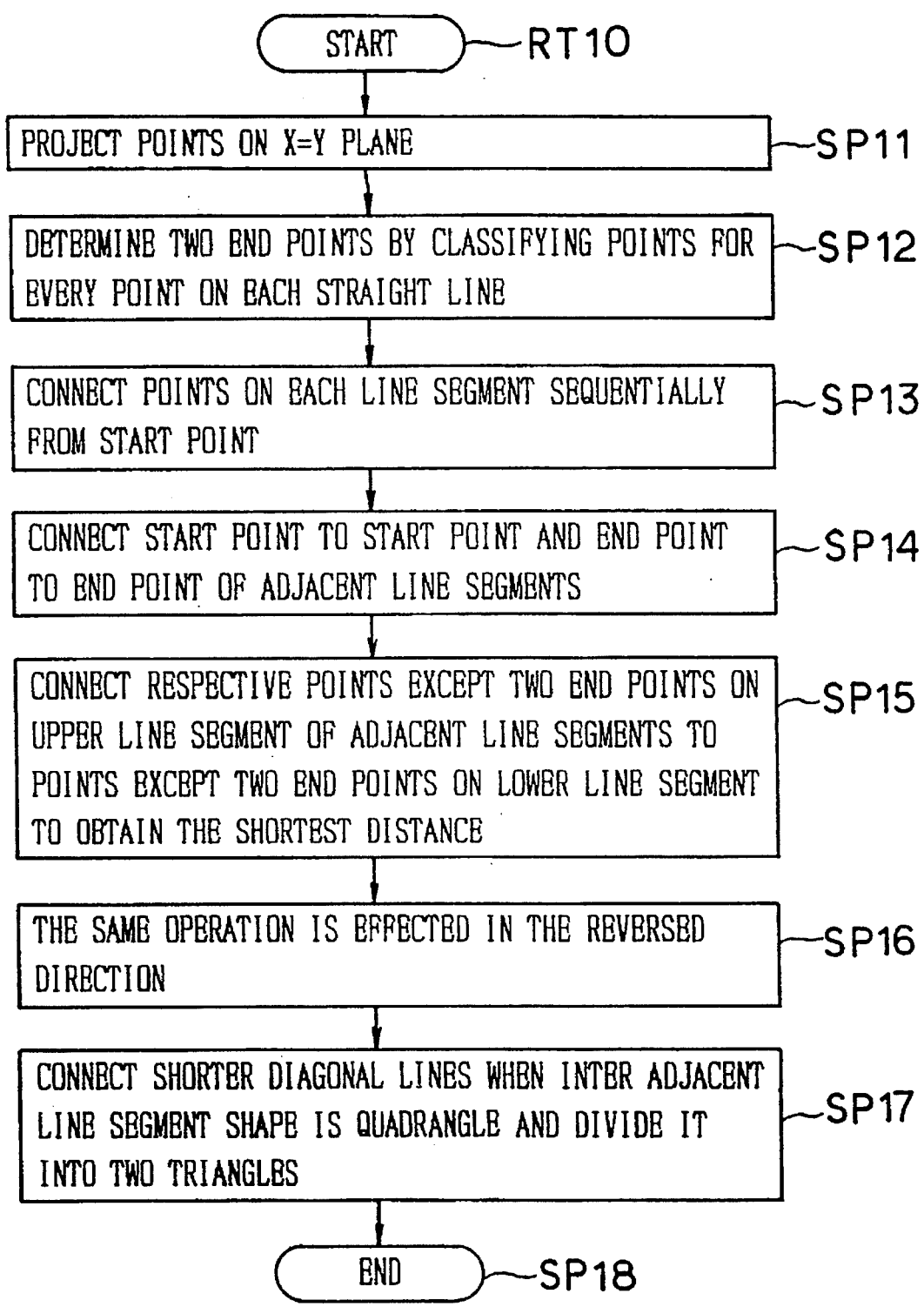
FIG. 9 is a flowchart showing procedures of triangle creation processing in a second embodiment.

In the second embodiment, the free-form surface data generating unit 3, when inputting the three-dimensional geometric data $DT_{TD}$ from the three-dimensional measuring unit 2, at first executes triangle creating processing procedures RT0 shown in FIG. 9 with respect to the three-dimensional geometric data $DT_{TD}$. A measurement object 5 is expressed by a plurality of triangles by connecting respective points in the three-dimensional geometric data $DT_{TD}$ without excess and deficiency.

Figure 10:
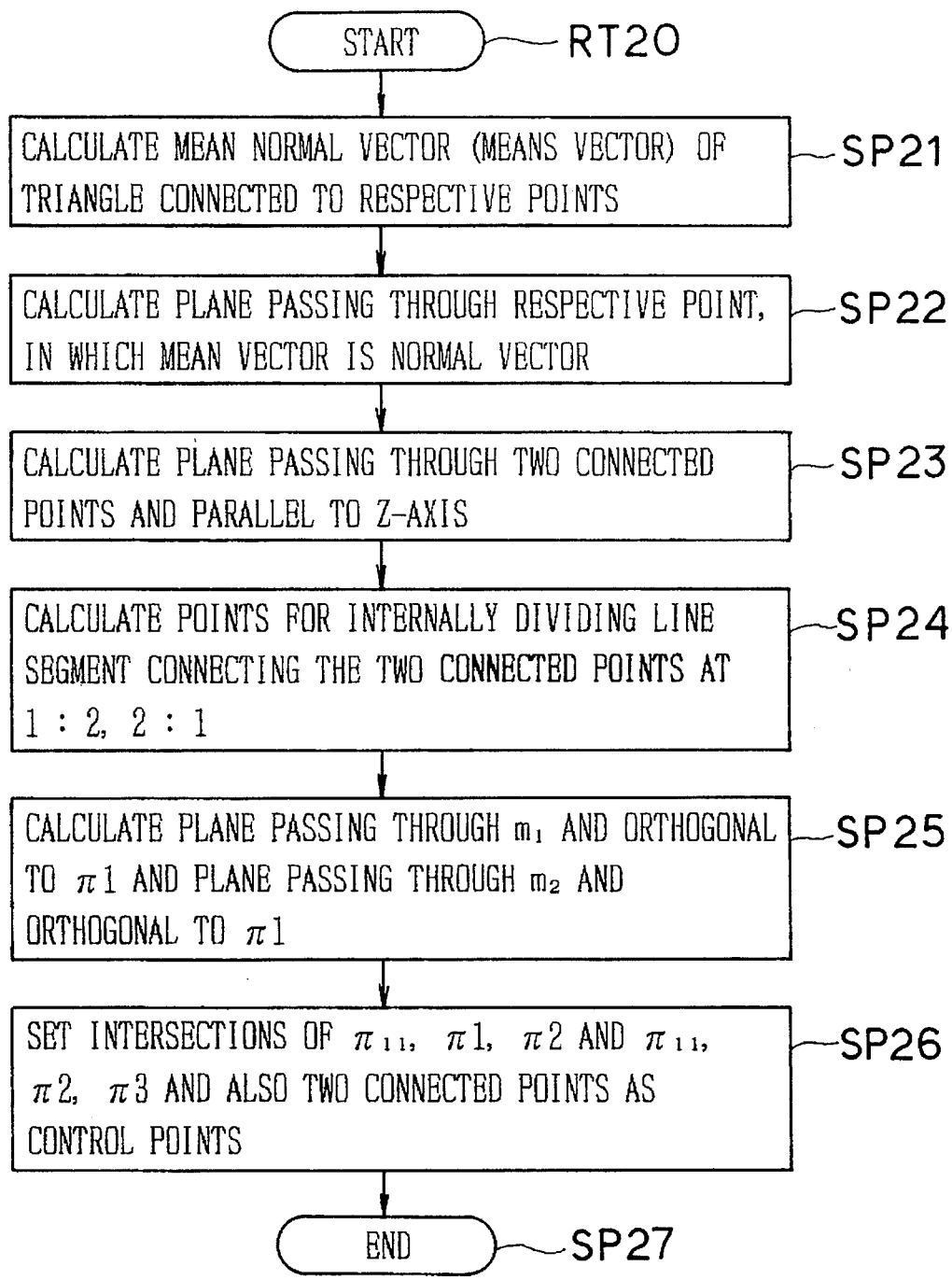
FIG. 10 is a flowchart showing procedures of trilateral patch frame creation processing.

The free-form surface data generating unit 3 subsequently executes trilateral patch frame preparation processing procedures RT10 shown in FIG. 10. Generated are control points representing boundary curves of the trilateral patches, with the plurality of triangles serving as a frame. Generated are the free-form surface data in which the measurement object 5 as a whole is expressed by the aggregates of trilateral patches.

More specifically, the CPU of the free-form surface data generating unit 3, when inputting the three-dimensional geometric data $DT_{TD}$ from the three-dimensional measuring unit 2, enters the triangle creation processing procedures RT0. Projected on an X-Y plane in the next step SP1 are a plurality of points including three-dimensional coordinates which constitutes the three-dimensional geometric data $DT_{TD}$.

Figure 11:
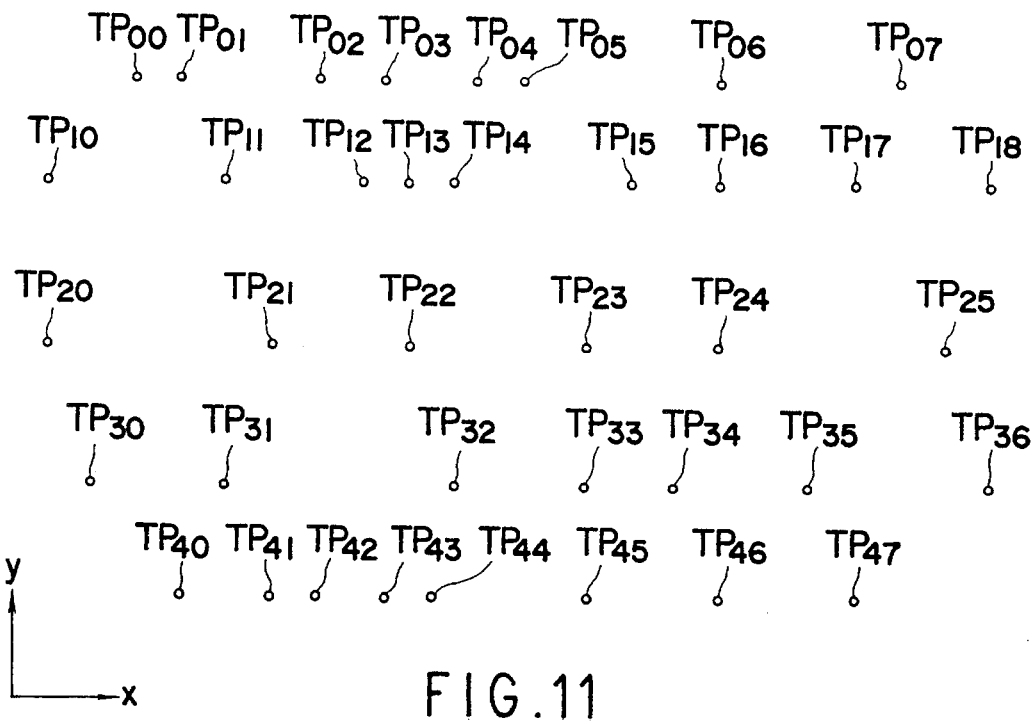
FIGS. 11 through 17 are schematic diagrams of assistance in explaining procedures of triangle creation processing.
Figure 12:
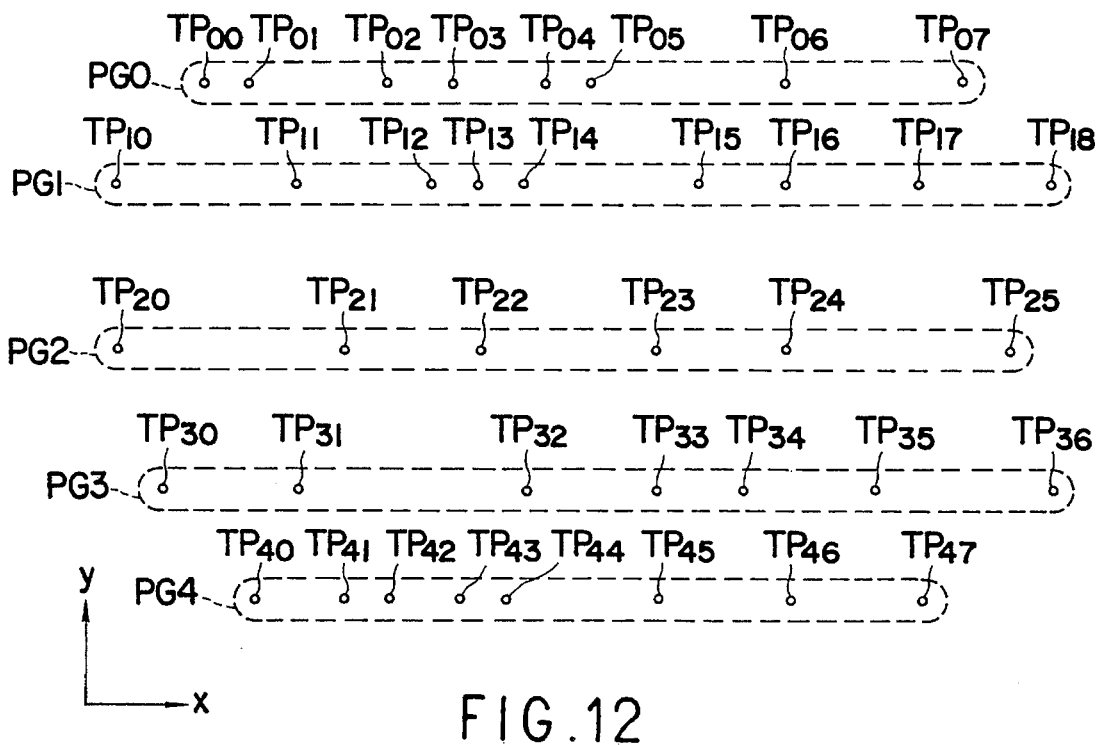

A plurality of point vectors $P_{00}$ —$P_{07}$, $P_{10}$ —$P_{18}$, $P_{20}$ —$P_{25}$, $P_{30}$ —$P_{36}$ and $P_{40}$ —$P_{47}$ of the three-dimensional geometric data $DT_{TD}$ are expressed by the X-Y coordinates on the X-Y plane. Formed, as illustrated in FIG. 11, on the X-Y plane are the projected points $TP_{00}$ —$TP_{07}$, $TP_{10}$ —$TP_{18}$, $TP_{20}$ —$TP_{25}$, $TP_{30}$ —$TP_{36}$ and $TP_{40}$ —$TP_{47}$. Subsequently in the next step SP2, the CPU classifies points arranged on the straight line among the projected points $TP_{00}$ —$TP_{07}$, $TP_{10}$ —$TP_{18}$, $TP_{20}$ —$TP_{25}$, $TP_{30}$ —$TP_{36}$ and $TP_{40}$ —$TP_{47}$ into, as shown in FIG. 12, point groups PG0, PG1, PG2, PG3 and PG4. The two end points $TP_{00}$ and $TP_{07}$, $TP_{10}$ and $TP_{18}$, $TP_{20}$ and $TP_{25}$, $TP_{30}$ and $TP_{36}$, $TP_{40}$ and $TP_{47}$ of the point groups PG0–PG4 are determined.

In the subsequent step SP3, the CPU performs inter-point connections by straight lines between the point vectors $P_{00}$ —$P_{07}$, $P_{10}$ —$P_{18}$, $P_{20}$ —$P_{25}$, $P_{30}$ —$P_{36}$ and $P_{40}$ —$P_{47}$ of the three-dimensional geometric data $DT_{TD}$ which correspond to the projected points $TP_{00}$ —$TP_{07}$, $TP_{10}$ —$TP_{18}$, $TP_{20}$ —$TP_{25}$, $TP_{30}$ —$TP_{36}$ and $TP_{40}$ —$TP_{47}$ of the point groups PG0, PG1, PG2, PG3 and PG4.

Figure 13:
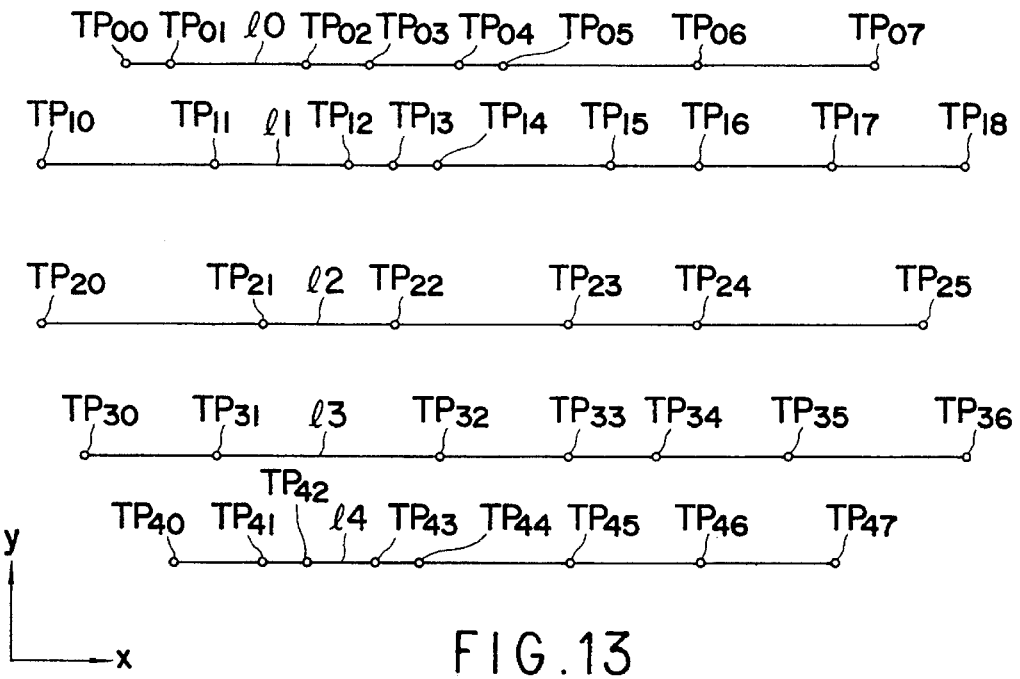

Projected resultantly on the X-Y plane, as illustrated in FIG. 13, are straight lines 10, 11, 12, 13 and 14 which connect the respective projected points $TP_{00}$ —$TP_{07}$, $TP_{10}$ —$TP_{18}$, $TP_{20}$ —$TP_{25}$, $TP_{30}$ —$TP_{36}$ and $TP_{40}$ —$TP_{47}$ sequentially from start points $TP_{00}$, $TP_{10}$, $TP_{20}$, $TP_{30}$ and $TP_{40}$.

After this step, the CPU in the next step SP4 effects, using the straight lines, connections between the point vectors $P_{00}$ and $P_{10}$, $P_{10}$ and $P_{20}$, $P_{20}$ and $P_{30}$, $P_{30}$ and $P_{40}$ of the three-dimensional geometric data $DT_{TD}$ and further connections between the points $P_{07}$ and $P_{18}$, $P_{18}$ and $P_{25}$, $P_{25}$ and $P_{36}$, $P_{36}$ and $P_{47}$ which all correspond to the start points $TP_{00}$ and $TP_{10}$, $TP_{10}$ and $TP_{20}$, $TP_{20}$ and $TP_{30}$, $TP_{30}$ and $TP_{40}$ and further end points $TP_{07}$ and $TP_{18}$, $TP_{18}$ and $TP_{25}$, $TP_{25}$ and $TP_{36}$, $TP_{36}$ and $TP_{47}$ of the adjacent straight lines 10 and 11, 11 and 12, 12 and 13, 13 and 14.

Figure 14:
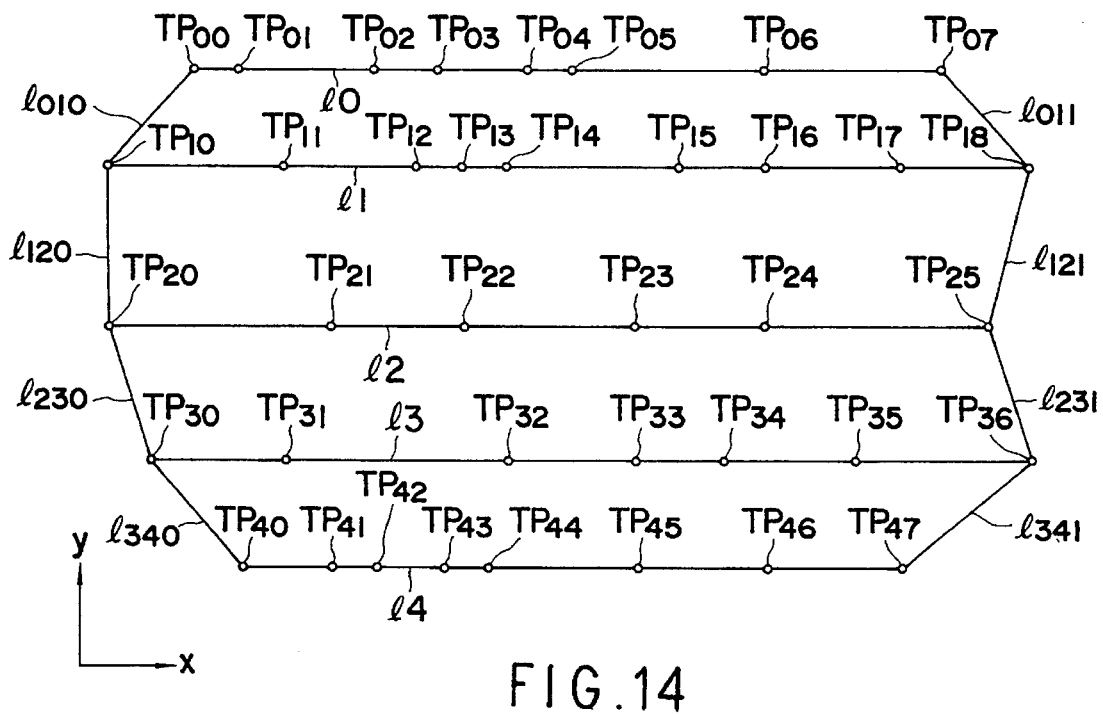

Projected resultantly on the X-Y place, as depicted in FIG. 14, are straight lines 1010, 1120, 1230 and 1340 which connect the start points $TP_{00}$, $TP_{10}$, $TP_{20}$, $TP_{30}$ and $TP_{40}$ of the straight lines 10, 11, 12, 13, and 14. Projected also are straight lines 1011, 1121, 1231 and 1341 which connect the end points $TP_{07}$, $TP_{18}$, $TP_{25}$, $TP_{36}$ and $TP_{47}$.

Figure 15:
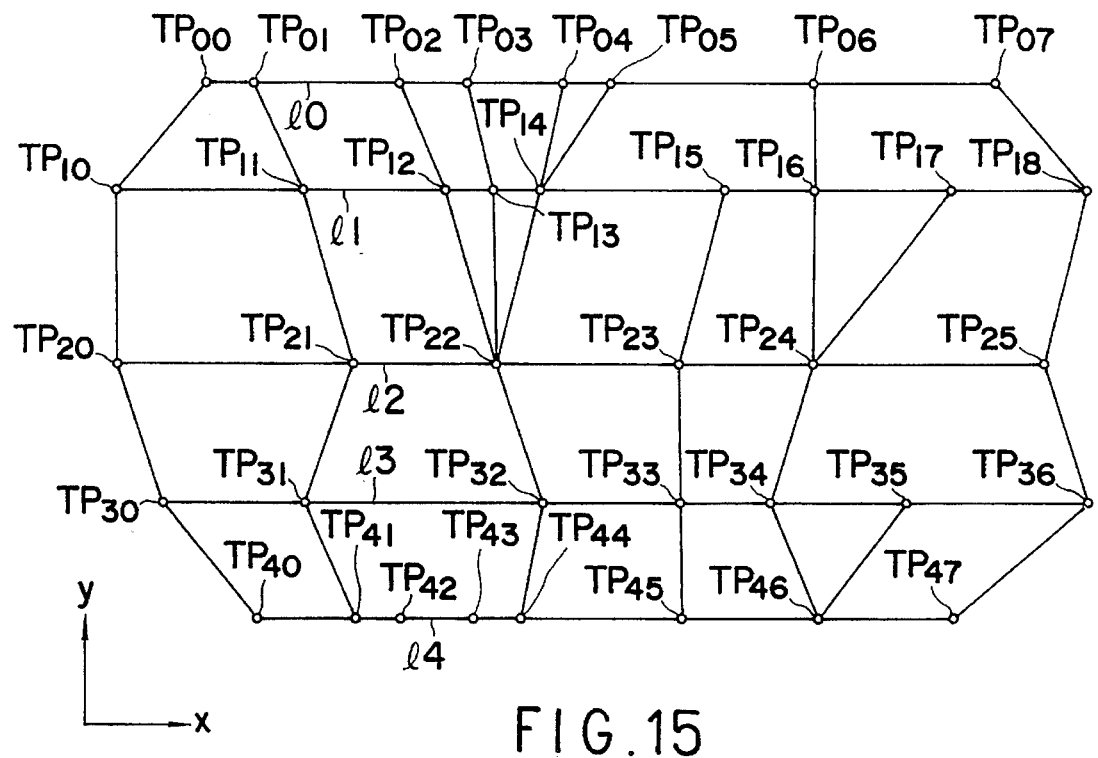

In the subsequent step SP5, the CPU detects shortest distance points on the X-Y plane among the respective points $TP_{11}$ —$TP_{17}$ except the two end points $TP_{10}$ and $TP_{18}$ of the straight line 11 from the individual points $TP_{01}$ —$TP_{06}$ except the two end points $TP_{00}$ and $TP_{07}$ of the straight line 10 with respect to the adjacent straight lines 10 and 11. Connected by the straight lines are the point vectors $P_{01}$ and $P_{11}$, $P_{02}$ and $P_{12}$, $P_{03}$ and $P_{13}$, $P_{04}$ and $P_{14}$, $P_{05}$ and $P_{14}$, $P_{06}$ and $P_{16}$ of the three-dimensional geometric data $DT_{TD}$ which correspond to the points $TP_{01}$ and $TP_{11}$, $TP_{02}$ and $TP_{12}$, $TP_{03}$ and $TP_{13}$, $TP_{04}$ and $TP_{14}$, $TP_{05}$ and $TP_{14}$, $TP_{06}$ and $TP_{16}$ on the resultantly obtained straight lines 10 and 11. Projected consequently on the X-Y plane, as shown in FIG. 15, are straight lines for respectively connecting the points $TP_{01}$ and $TP_{11}$, $TP_{02}$ and $TP_{12}$, $TP_{03}$ and $TP_{13}$, $TP_{04}$ and $TP_{14}$, $TP_{05}$ and $TP_{14}$, $TP_{06}$ and $TP_{16}$ on the straight lines 10 and 11.

These processes are sequentially executed with respect to the adjacent straight lines 11 and 12, 12 and 13, 13 and 14.

To be specific, there are at first connected by the straight lines between the point vectors $P_{11}$ and $P_{21}$, $P_{12}$ and $P_{22}$, $P_{13}$ and $P_{22}$, $P_{14}$ and $P_{22}$, $P_{15}$ and $P_{23}$, $P_{16}$ and $P_{24}$, $P_{17}$ and $P_{24}$ of the three-dimensional geometric data $DT_{TD}$ which correspond to the points $TP_{11}$ and $TP_{21}$, $TP_{12}$ and $TP_{22}$, $TP_{13}$ and $TP_{22}$, $TP_{14}$ and $TP_{22}$, $TP_{15}$ and $TP_{23}$, $TP_{16}$ and $TP_{24}$, $TP_{17}$ and $TP_{24}$ on the straight lines 11 and 12. Projected resultantly on the X-Y plane, as illustrated in FIG. 15, are straight lines for respectively connecting the points $TP_{11}$ and $TP_{21}$, $TP_{12}$ and $TP_{22}$, $TP_{13}$ and $TP_{22}$, $TP_{14}$ and $TP_{22}$, $TP_{15}$ and $TP_{23}$, $TP_{16}$ and $TP_{24}$, $TP_{17}$ and $TP_{24}$ on the straight lines 11 and 12.

Connected also by the straight lines are the point vectors $P_{21}$ and $P_{31}$, $P_{22}$ and $P_{32}$, $P_{23}$ and $P_{33}$, $P_{24}$ and $P_{34}$ of the three-dimensional geometric data $DT_{TD}$ which correspond to the points $TP_{21}$ and $TP_{31}$, $TP_{22}$ and $TP_{32}$, $TP_{23}$ and $TP_{33}$, $TP_{24}$ and $TP_{34}$ on the straight lines and 13. Projected consequently on the X-Y plane, as depicted in FIG. 15, are straight lines for respectively connecting the points $TP_{21}$ and $TP_{31}$, $TP_{22}$ and $TP_{32}$, $TP_{23}$ and $TP_{33}$, $TP_{24}$ and $TP_{34}$ on the straight lines 12 and 13.

Connected further by the straight lines are the point vectors $P_{31}$ and $P_{41}$, $P_{32}$ and $P_{44}$, $P_{33}$ and $P_{45}$, $P_{34}$ and $P_{46}$, $P_{35}$ and $P_{46}$ of the three-dimensional geometric data $DT_{TD}$ which correspond to the points $TP_{31}$ and $TP_{41}$, $TP_{32}$ and $TP_{44}$, $TP_{33}$ and $TP_{45}$, $TP_{34}$ and $TP_{46}$, $TP_{35}$ and $TP_{46}$ on the straight lines 13 and 14. Projected resultantly on the X-Y plane, as illustrated in FIG. 15 are straight lines for respectively connecting the points $TP_{31}$ and $TP_{41}$, $TP_{32}$ and $TP_{44}$, $TP_{33}$ and $TP_{45}$, $TP_{34}$ and $TP_{46}$, $TP_{35}$ and $TP_{46}$ on the straight lines 13 and 14.

Subsequently in the step $SP_6$, the CPU executes the same process with respect to the opposite-sided adjacent straight lines 14 and 13, 13 and 12, 12 and 11, 11 and 10.

Figure 16:
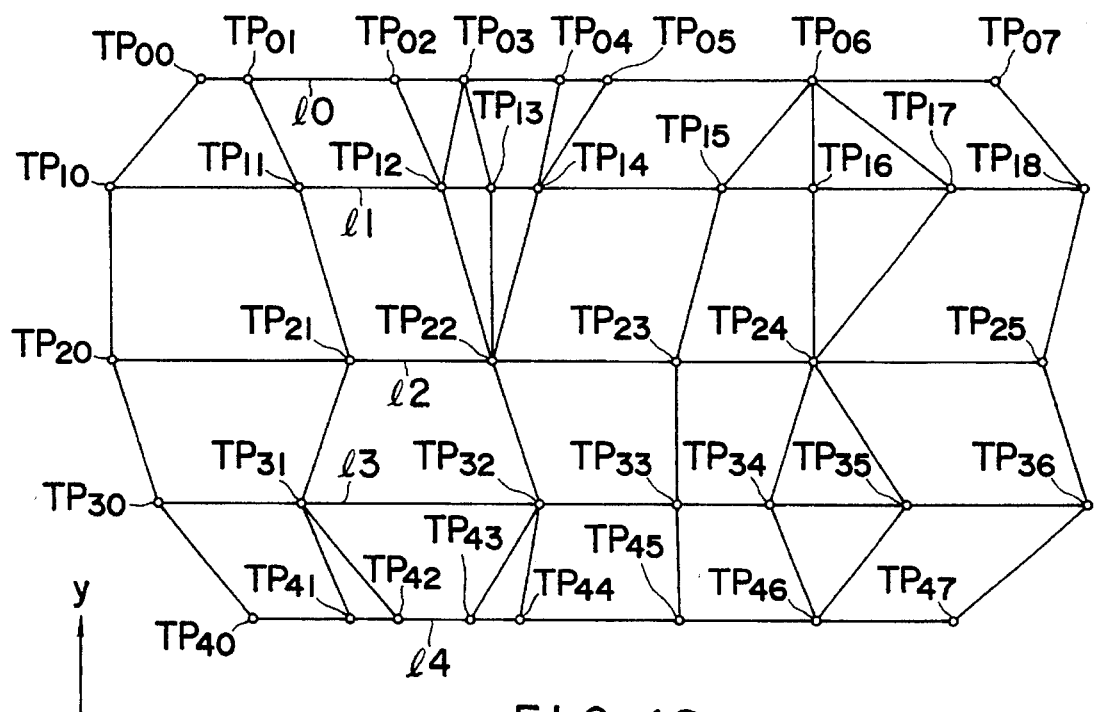

Namely, there are at first connected by the straight lines the point vectors $P_{41}$ and $P_{31}$, $P_{42}$ and $P_{31}$, $P_{43}$ and $P_{32}$, $P_{44}$ and $P_{32}$, $P_{45}$ and $P_{33}$, $P_{46}$ and $P_{34}$ of the three-dimensional geometric data $DT_{TD}$ which correspond to the points $TP_{41}$ and $TP_{31}$, $TP_{42}$ and $TP_{31}$, $TP_{43}$ and $TP_{32}$, $TP_{44}$ and $TP_{32}$, $TP_{45}$ and $TP_{33}$, $TP_{46}$ and $TP_{34}$ on the straight lines 14 and 13. Projected consequently on the X-Y plane, as illustrated in FIG. 16, are straight lines for respectively connecting the points $TP_{41}$ and $TP_{31}$, $TP_{42}$ and $TP_{31}$, $TP_{43}$ and $TP_{32}$, $TP_{44}$ and $TP_{32}$, $TP_{45}$ and $TP_{33}$, $TP_{46}$ and $TP_{34}$ on the straight lines 14 and 13.

Connected also by the straight lines are the point vectors $P_{31}$ and $P_{21}$, $P_{32}$ and $P_{22}$, $P_{33}$ and $P_{23}$, $P_{34}$ and $P_{24}$, $P_{35}$ and $P_{24}$ of the three-dimensional geometric data $DT_{TD}$ which correspond to the points $TP_{31}$ and $TP_{21}$, $TP_{32}$ and $TP_{22}$, $TP_{33}$ and $TP_{23}$, $TP_{34}$ and $TP_{24}$, $TP_{35}$ and $TP_{24}$ on the straight lines 13 and 12. Projected resultantly on the X-Y plane, as depicted in FIG. 16, are straight lines for respectively connecting the points $TP_{31}$ and $TP_{21}$, $TP_{32}$ and $TP_{22}$, $TP_{33}$ and $TP_{23}$, $TP_{34}$ and $TP_{24}$, $TP_{35}$ and $TP_{24}$ on the straight lines 13 and 12.

Connected further by the straight lines are the point vectors $P_{21}$ and $P_{11}$, $P_{22}$ and $P_{13}$, $P_{23}$ and $P_{15}$, $P_{24}$ and $P_{16}$ of the three-dimensional geometric data $DT_{TD}$ which correspond to the points $TP_{21}$ and $TP_{11}$, $TP_{22}$ and $TP_{13}$, $TP_{23}$ and $TP_{15}$, $TP_{24}$ and $TP_{16}$ on the straight lines 12 and 11. Projected consequently on the X-Y plane, as illustrated in FIG. 16, are straight lines for respectively connecting the points $TP_{21}$ and $TP_{11}$, $TP_{22}$ and $TP_{13}$, $TP_{23}$ and $TP_{15}$, $TP_{24}$ and $TP_{16}$ on the straight lines 12 and 11.

Connected also by the straight lines are the point vectors $P_{11}$ and $P_{01}$, $P_{12}$ and $P_{03}$, $P_{13}$ and $P_{03}$, $P_{14}$ and $P_{04}$, $P_{15}$ and $P_{06}$, $P_{16}$ and $P_{06}$, $P_{17}$ and $P_{06}$ of the three-dimensional geometric data $DT_{TD}$ which correspond to the points $TP_{11}$ and $TP_{01}$, $TP_{12}$ and $TP_{03}$, $TP_{13}$ and $TP_{03}$, $TP_{14}$ and $TP_{04}$, $TP_{15}$ and $TP_{06}$ and $TP_{16}$ and $TP_{06}$, $TP_{17}$ and $TP_{06}$ on the straight lines 11 and 10. Projected resultantly on the X-Y plane are, as depicted in FIG. 16, straight lines for respectively connecting the points $TP_{11}$ and $TP_{01}$, $TP_{12}$ and $TP_{03}$, $TP_{13}$ and $TP_{03}$, $TP_{14}$ and $TP_{04}$, $TP_{15}$ and $TP_{06}$, $TP_{16}$ and $TP_{06}$, $TP_{17}$ and $TP_{06}$ on the straight lines 11 and 10.

Subsequently in the next step SP7, the CPU detects whether or not there: exist quadrangles between the adjacent straight lines 10 and 11, 11 and 12, 12 and 13, 13 and 14 on the X-Y plane. If the quadrangles exist, there are connected the points of the three-dimensional geometric data $DT_{TD}$ which correspond to short distance points of diagonal lines of the quadrangles on the X-Y plane.

Figure 17:
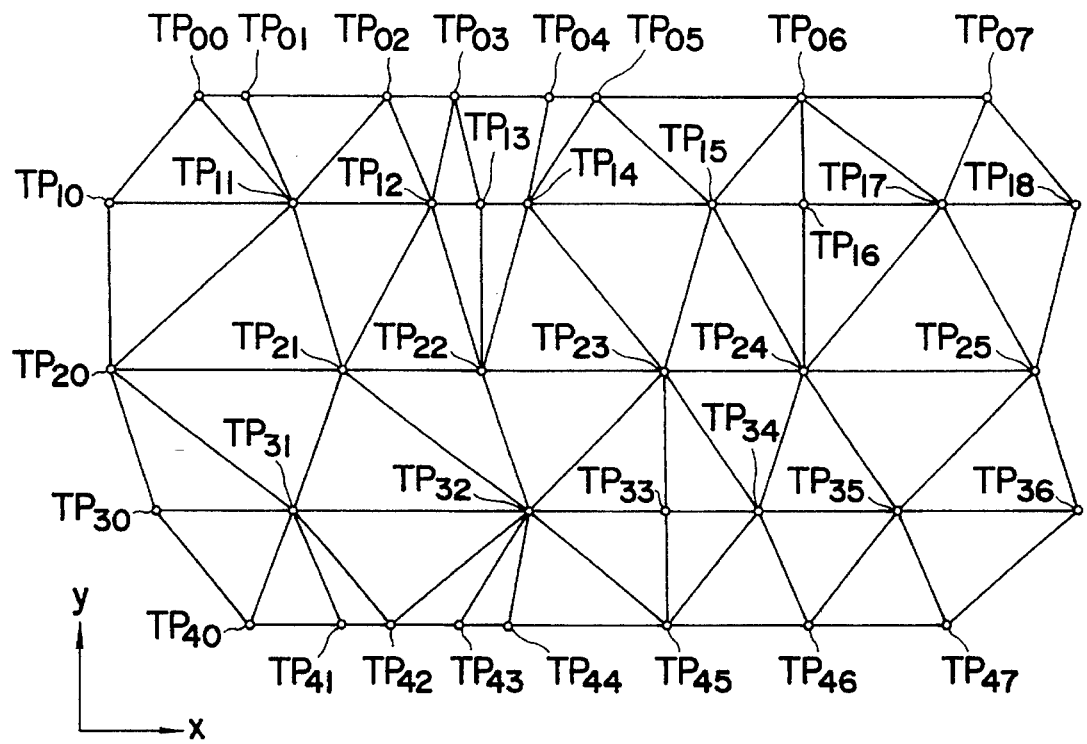

In the quadrangles $TP_{00}$ —$TP_{01}$ —$TP_{11}$ —$TP_{10}$, $TP_{01}$ —$TP_{02}$ —$TP_{12}$ —$TP_{11}$, $TP_{05}$ —$TP_{06}$ —$TP_{15}$ —$TP_{14}$ and $TP_{06}$ —$TP_{07}$ —$TP_{18}$ —$TP_{17}$ which actually exist between the straight lines 10 and 11, diagonal lines $TP_{00}$ —$TP_{11}$, $TP_{02}$ —$TP_{11}$, $TP_{05}$ —$TP_{15}$ and $TP_{07}$ —$TP_{17}$ are selected. Connected by the straight lines are the point vectors $P_{00}$ and $P_{11}$, $P_{02}$ and $P_{11}$, $P_{05}$ and $P_{15}$, $P_{07}$ and $P_{17}$ of the three-dimensional geometric data $DT_{TD}$ which correspond thereto. Projected resultantly on the X-Y plane are, as illustrated in FIG. 17, the points $TP_{00}$ and $TP_{11}$, $TP_{02}$ and $TP_{11}$, $TP_{05}$ and $TP_{15}$, $TP_{07}$ and $TP_{17}$ on the straight lines 10 and 11.

Besides, in the quadrangles $TP_{10}$ —$TP_{11}$ —$TP_{21}$ —$TP_{20}$, $TP_{11}$ —$TP_{12}$ —$TP_{22}$ —$TP_{21}$, $TP_{14}$ —$TP_{15}$ —$TP_{23}$ —$TP_{22}$, $TP_{15}$ —$TP_{16}$ —$TP_{24}$ —$TP_{23}$ and $TP_{17}$ —$TP_{18}$ —$TP_{24}$ —$TP_{24}$ which exist between the straight lines 11 and 12, the diagonal lines $TP_{11}$ —$TP_{20}$, $TP_{12}$ —$TP_{21}$, $TP_{14}$ —$TP_{23}$, $TP_{15}$ —$TP_{24}$ and $TP_{17}$ —$TP_{25}$ are selected. Connected by the straight lines are the point vectors $P_{11}$ and $P_{20}$, $P_{12}$ and $P_{21}$, $P_{14}$ and $P_{23}$, $P_{15}$ and $P_{24}$, $P_{17}$ and $P_{25}$ of the three-dimensional geometric data $DT_{TD}$ which correspond thereto. Projected resultantly on the X-Y plane are, as shown in FIG. 17, straight lines for respectively connecting the points $TP_{11}$ and $TP_{20}$, $TP_{12}$ and $TP_{21}$, $TP_{14}$ and $TP_{23}$, $TP_{15}$ and $TP_{24}$, $TP_{17}$ and $TP_{25}$ on the straight lines 11 and 12.

Further, in the quadrangles $TP_{20}$ —$TP_{21}$ —$TP_{31}$ —$TP_{30}$, $TP_{21}$ —$TP_{22}$ —$TP_{32}$ —$TP_{31}$, $TP_{22}$ —$TP_{23}$ —$TP_{33}$ —$TP_{32}$, $TP_{23}$ —$TP_{24}$ —$TP_{34}$ —$TP_{33}$ and $TP_{24}$ —$TP_{25}$ —$TP_{36}$ —$TP_{35}$ which exist between the straight lines 12 and 13, the diagonal lines $TP_{20}$ —$TP_{31}$, $TP_{21}$ —$TP_{32}$, $TP_{23}$ —$TP_{32}$, $TP_{23}$ —$TP_{34}$ are $TP_{25}$ —$TP_{35}$ are selected. Connected by the straight lines are the point vectors $P_{20}$ and $P_{31}$, $P_{21}$ and $P_{32}$, $P_{23}$ and $P_{32}$, $P_{23}$ and $P_{34}$, $P_{25}$ and $P_{35}$ of the three-dimensional geometric data $DT_{TD}$ which correspond thereto. Projected resultantly on the X-Y plane are, as illustrated in FIG. 17, straight lines for respectively connecting the points $TP_{20}$ and $TP_{31}$, $TP_{21}$ and $TP_{32}$, $TP_{23}$ and $TP_{32}$, $TP_{23}$ and $TP_{34}$, $TP_{25}$ and $TP_{35}$ on the straight lines 12 and 13.

Moreover, in the quadrangles $TP_{30}$ —$TP_{31}$ —$TP_{41}$ —$TP_{40}$, $TP_{31}$ —$TP_{32}$ —$TP_{43}$—$TP_{42}$, $TP_{32}$ —$TP_{33}$ —$TP_{45}$ —$TP_{44}$, $TP_{33}$ —$TP_{34}$ —$TP_{46}$ —$TP_{45}$ and $TP_{35}$ —$TP_{36}$ —$TP_{47}$ —$TP_{46}$ which exist between the straight lines 13 and 14, the diagonal lines $TP_{31}$ —$TP_{40}$, $TP_{32}$ —$TP_{42}$, $TP_{32}$ —$TP_{45}$, $TP_{34}$ —$TP_{45}$ and $TP_{35}$ —$TP_{47}$ are selected. Connected by the straight lines are the point vectors $P_{31}$ and $P_{40}$, $P_{32}$ and $P_{42}$, $P_{32}$ and $P_{45}$, $P_{34}$ and $P_{45}$, $P_{35}$ and $P_{47}$ of the three-dimensional geometric data $DT_{TD}$ which correspond thereto. Projected resultantly on the X-Y plane are, as shown in FIG. 17, straight lines for respectively connecting the points $TP_{31}$ and $TP_{40}$, $TP_{32}$ and $TP_{42}$, $TP_{32}$ and $TP_{45}$, $TP_{34}$ and $TP_{45}$, $TP_{35}$ and $TP_{47}$ on the straight lines 13 and 14.

In this way, the free-form surface preparing unit 3 projects, on the X-Y plane, the respective point vectors P ($P_{00}$ —$P_{07}$, $P_{10}$ —$P_{18}$, $P_{20}$ —$P_{25}$, $P_{30}$ —$P_{36}$, $P_{40}$ —$P_{47}$) in the three-dimensional geometric data $DT_{TD}$ to be inputted. The respective point vectors P in the three-dimensional geometric data $DT_{TD}$ are connectable without excess and deficiency, corresponding to the projected points TP ($TP_{00}$ —$TP_{07}$, $TP_{10}$ —$TP_{18}$, $TP_{20}$ —$TP_{25}$, $TP_{30}$ —$TP_{36}$, $TP_{40}$ —$TP_{47}$). A plurality of triangles which depict the measurement object 5 are thus created.

Thereafter, the CPU finishes the triangle creating processing procedures RT0 in the next step SP8.

Figure 18:
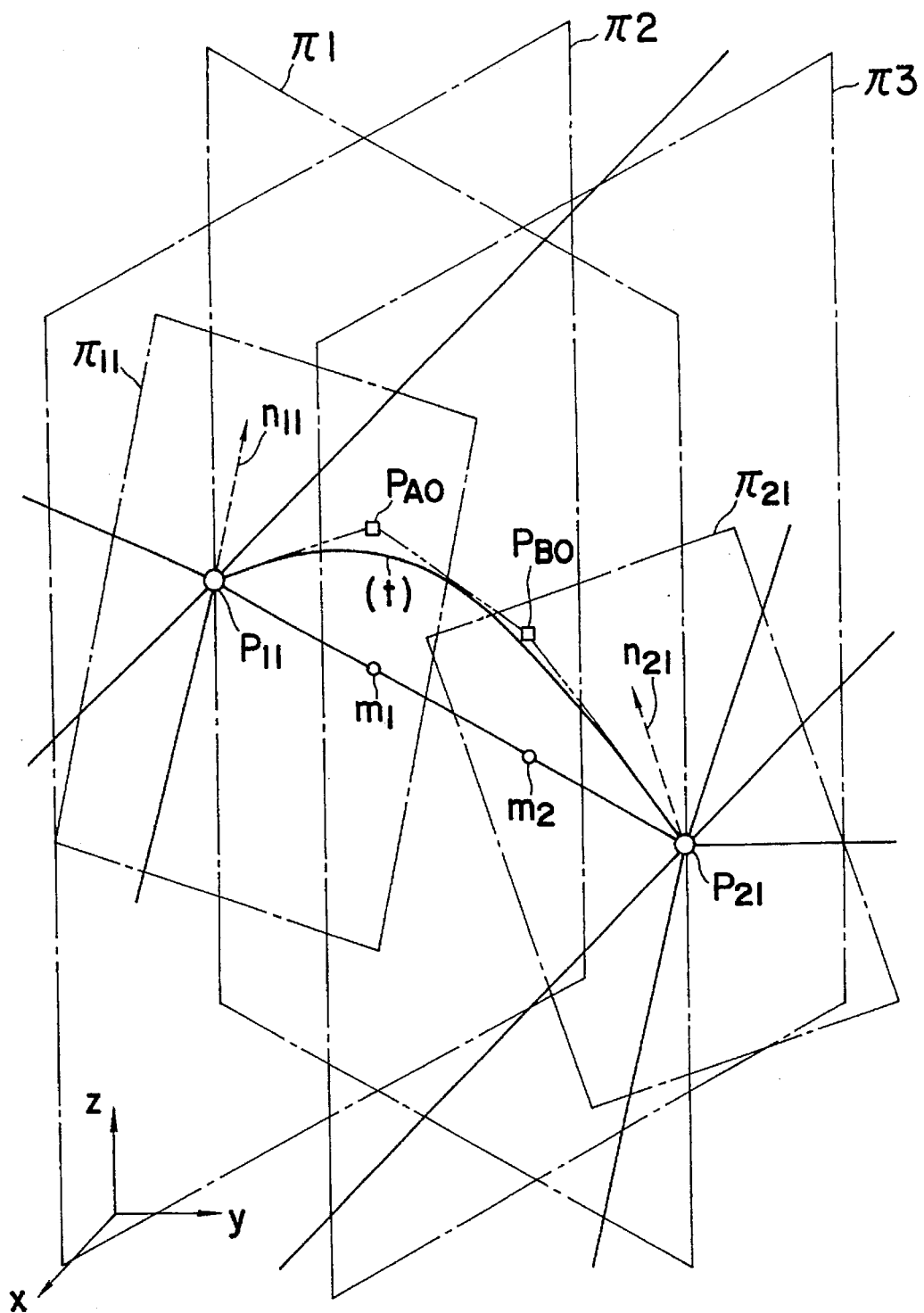
FIG. 18 is a schematic diagram of assistance in explaining procesures of trilateral patch frame creation processing.

Subsequently, the CPU enters the trilateral patch frame creation processing procedures RT10. In the step SP11, the CPU seeks respective normal vectors of seven triangle vectors $P_{11}$ —$P_{00}$ —$P_{01}$, $P_{11}$ —$P_{01}$ —$P_{02}$, $P_{11}$ —$P_{02}$ —$P_{12}$, $P_{11}$ —$P_{12}$ —$P_{21}$, $P_{11}$ —$P_{21}$ —$P_{20}$, $P_{11}$ —$P_{20}$ —$P_{10}$ and $P_{11}$ —$P_{10}$ —$P_{00}$ in the three-dimensional space which are, as illustrated in FIG. 18, connected to an arbitrary point vector P among the point vectors $P_{00}$ —$P_{07}$, $P_{10}$ —$P_{18}$, $P_{20}$ —$P_{25}$, $P_{30}$ —$P_{36}$ and $P_{40}$ —$P_{47}$ of the three-dimensional geometric data $DT_{TD}$. The CPU simultaneously obtains a mean vector $n_{11}$ based on a means value of the respective normal vectors.

The CPU also seeks means vectors n ($n_{00}$ —$N_{07}$, $n_{10}$ —$n_{18}$, $n_{20}$ —$n_{25}$, $n_{30}$ —$n_{36}$, $n_{40}$ —$n_{47}$) with respect to all the point vectors P ($P_{00}$ —$P_{07}$, $P_{10}$ —$P_{18}$, $P_{20}$ —$P_{25}$, $P_{30}$ —$P_{36}$, $P_{40}$ —$P_{47}$) of the three dimensional geometric data $DT_{TD}$ in the same manner as above. Subsequently in the next step SP12, the CPU obtains planes $\pi(\pi_{00}$ —$\pi_{07}$, $\pi_{10}$ —$\pi_{18}$, $\pi_{20}$ —$\pi_{25}$, $\pi_{30}$ —$\pi_{36}$, $\pi_{40}$ —$\pi_{47}$) in which corresponding mean vectors n serve as normal vectors, the planes passing through the respective vectors P of the three-dimensional geometric data $DT_{TD}$.

In the wake of this step, the CPU obtains the plane $\pi 1$ including two points connected by a straight line, e.g., as shown in FIG. 18, the two point vectors $P_{11}$ and $P_{21}$ and parallel to the Z-axis in the next step SP13. Obtained in the subsequent step SP14 are point vectors $m_1$ and $m_2$ for internally dividing the straight line between the two point vectors $P_{11}$ and $P_{21}$ at ratios of 1:2 and 2:1.

Further in the next step SP15, the CPU obtains the planes $\pi 2$ and $\pi 3$ including the point vectors $m_1$ and $m_2$ for internally dividing the straight line between the vectors $P_{11}$ and $P_{21}$ and orthogonal to the plane $\pi 1$. Obtained respectively in the subsequent step SP16 are intersections between the planes $\pi 11$, $\pi 1$, $\pi 2$ and between the planes $\pi 21$, $\pi 1$, $\pi 3$. These intersections serve as control point vectors $P_{A0}$ and $P_{B0}$. A boundary curvilinear vector R(t) having the control points $P_{A0}$ and $P_{B0}$ between the two points $P_{11}$ and $P_{21}$ is calculated based on the cubic Bezier formula.

Note that the CPU repeats the calculation of the boundary curvilinear vector R(t) described in the steps SP13–SP16 with respect to all the straight lines for connecting the respective point vectors $P_{00}$ —$P_{07}$, $P_{10}$ —$P_{18}$, $P_{20}$ —$P_{25}$, $P_{30}$ —$P_{36}$ and $P_{40}$ —$P_{47}$ of the three-dimensional geometric data $DT_{TD}$. In the subsequent step SP17, the trilateral patch frame creation processing procedures RT10 come to an end.

In this manner, the free-form surface data generating unit 3 replaces the respective triangle edges of the measurement object 5 expressed by the triangles with the boundary curvilinear vectors R(t) expressed by the Bezier formula. The free-form surface data can be thereby prepared, wherein the measurement object 5 is expressed by the frame spaces consisting of the aggregates of trilateral patches connected to each other.

Figure 19:
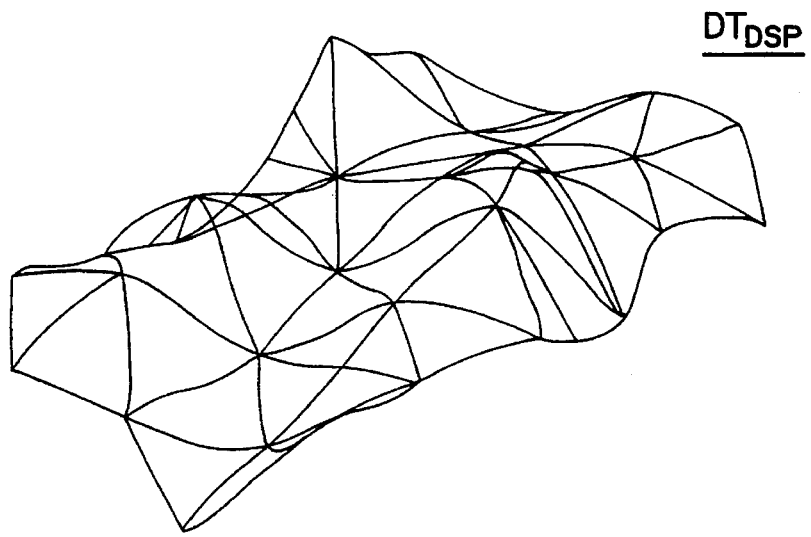
FIG. 19 is a schematic diagram showing a display example of generated free-form surface data.

The thus prepared free-form surface data are transmitted as display data $DT_{DSP}$ to the display unit 4. The free-form surface data in which the measurement object 5 is expressed by the frame spaces of the trilateral patches are, as illustrated in FIG. 19, displayed on a display screen of the display unit 4.

Thus, the designer automatically acquires the free-form surface data in which the measurement object 5 of a mockup or the like is expressed by the aggregates of trilateral patches. Thereafter, a variety of transformations with respect to the free-form surface data are effected by the method discussed above. Designing of a desired object can be executed at an extremely high efficiency.

Generated based on the method discussed above are the control points expressing the boundary curves of the trilateral patches, wherein the frames are formed of the plurality of triangles obtained by connecting the plurality of points in the three-dimensional geometric data without excess and deficiency in which a predetermined object is expressed by the plurality of point groups existing on the plurality of parallel planes. It is therefore possible to easily generate the free-form surface data composed of the aggregates of trilateral patches from the three-dimensional geometric data. Thus, the free-form surface data generating method capable of improving the facility to the designer can be attained.

(6) Modification of the second embodiment (6-1) The embodiment shown in FIGS. 9 through 19 has dealt with a case where the three-dimensional measuring unit used therein is of the contact type. The present invention is not, however, limited to this type but may employ an optical three-dimensional measuring unit or the like. Even in such a case, when obtaining the three-dimensional geometric data in which a predetermined object is expressed by a plurality of points existing on a plurality of parallel planes, the same effects as those of the above-described embodiments can be exhibited.

(6-2) Given in the embodiment of FIGS. 9 through 19 was an explanation about a case where the trilateral patches expressed by the cubic Bezier formula are stretched over the frame spaces according to the present invention. The degree of the mathematical formula is not limited to this. The Bezier formula of degree four or more may also be usable.

(6-3) In the embodiment of FIGS. 9 to 19, there has been described a case of stretching the trilateral patches expressed by the Bezier formula. The present invention is not, however, limited to this but may use other vector functions such as the B-spline type, the Furgason type and the like.

1 . . . free-form surface generating device, 2 . . . three-dimensional measuring unit, 3 . . . free-form surface generating unit, 4 . . . key input unit, 5 . . . . display unit, 6 . . . measurement object, 7 . . . X-Y table, vector $T_{(u,v)}$, $T_{(u,v)1}$, $T_{(u,v)2}$ . . . trilateral patch, vector $P_{(00)}$, $P_{(03)}$, $P_{(30)1}$, $P_{(30)2}$ . . . node, vector $P_{(10)1}$, $P_{(20)1}$, $P_{(12)1}$, $P_{(21)1}$, $P_{(10)2}$, $P_{(20)2}$, $P_{(12)2}$, $P_{(21)2}$ . . . control point, vector $P_{(11)1}$, $P_{(11)2}$ . . . connection internal control point, vector $a_0$, $a_1$, $a_2$, $b_1$, $b_2$, $b_3$, $c_0$, $c_1$, $c_2$ . . . control edge vector, COM, $COM_{NEW}$ . . . common boundary, vector $P_{00}$ —$P_{07}$, $P_{10}$ —$P_{18}$, $P_{20}$ —$P_{25}$, $P_{30}$ —$P_{36}$, $P_{40}$ —$P_{47}$ . . . point, $TP_{00}$ —$TP_{07}$, $TP_{10}$ —$TP_{18}$, $TP_{20}$ —$TP_{25}$, $TP_{30}$ —$TP_{36}$, $TP_{40}$ —$TP_{47}$ . . . projected point.

What is claimed is:

1. A free-form surface data generating method for creating a free-form surface by forming trilateral patches expressed by predetermined vector functions over a multiplicity of frame spaces encircled by boundary curves by frame processing, comprising the steps of:

inputting frame space data representing the frame spaces;

forming first and second trilateral patches over the frame spaces and connected by a common boundary;

when a transformation of said common boundary is specified, arbitrarily transforming said common boundary and changing the connection of said first and second trilateral patches to maintain a predetermined relation in surface geometry thereof, when a non-transformation of said boundary is specified, maintaining a curvilinear configuration of said common boundary and changing the connection of said first and second trilateral patches by arbitrarily transforming said surface geometry of the first and second trilateral patches;

whereby said first and second trilateral patches are connected smoothly; and displaying said first and second trilateral patches on a display unit.

2. A free-form surface data generating method for creating a free-form surface by forming trilateral patches expressed by predetermined vector functions over a multiplicity of frame spaces encircled by boundary curves by frame processing, comprising the steps of:

inputting frame space data representing the frame spaces;

forming first and second trilateral patches over the frame spaces and connected by a common boundary; and changing the connection of said first and second trilateral patches so that a first tangent vector along said common boundary and second and third tangent vectors invariably exist on a same plane at an arbitrary point on said common boundary, where said second and third tangent vectors are directed to said first and second trilateral patches across said common boundary;

whereby said first and second trilateral patches are connected smoothly; and displaying said first and second trilateral patches on a display unit.

3. A free-form surface data generating method for creating a free-form surface by forming trilateral patches expressed by predetermined vector functions over a multiplicity of frame spaces encircled by boundary curves by frame processing, comprising the steps of:

inputting three-dimensional geometric data in which a predetermined object is expressed creating a plurality of trilateral patches by connecting a plurality of points in the three-dimensional geometric data by a plurality of point groups existing on a plurality of parallel planes in accordance with a plurality of projected points projected on planes orthogonal to said plurality of parallel planes; and creating free-form surface data in which said predetermined object is expressed as aggregates of said trilateral patches by generating control points representing boundary curves of said trilateral patches with said plurality of trilateral patches serving as frames; and displaying said predetermined object using said free form surface data on a display unit.

* * * * *